US007615895B2

(12) United States Patent
Lee et al.

(10) Patent No.: US 7,615,895 B2
(45) Date of Patent: Nov. 10, 2009

(54) OUTER ROTOR TYPE MOTOR FOR DRUM TYPE WASHING MACHINE AND METHOD FOR FABRICATING THE SAME

(75) Inventors: Deug Hee Lee, Changwon-si (KR); Seung Bong Choi, Changwon-si (KR); Byung Hwan Ahn, Changwon-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/905,141

(22) Filed: Sep. 27, 2007

(65) Prior Publication Data

US 2008/0084126 A1 Apr. 10, 2008

Related U.S. Application Data

(62) Division of application No. 11/008,407, filed on Dec. 10, 2004, now Pat. No. 7,294,942.

(30) Foreign Application Priority Data

| Dec. 10, 2003 | (KR) | ............... 10-2003-89721 |
| Dec. 10, 2003 | (KR) | ............... 10-2003-89722 |
| Dec. 10, 2003 | (KR) | ............... 10-2003-89723 |
| Dec. 10, 2003 | (KR) | ............... 10-2003-89724 |
| Dec. 10, 2003 | (KR) | ............... 10-2003-89726 |

(51) Int. Cl.
*H02K 1/27* (2006.01)
*H02K 15/03* (2006.01)

(52) U.S. Cl. ............... 310/43; 310/156.21; 310/156.79; 310/216; 310/217; 310/254; 68/140; 68/12.16

(58) Field of Classification Search .................. 310/43, 310/216, 217, 156.21, 156.31, 156.79, 67 R, 310/51, 254, 258, 259, 215; 68/140, 12.16
See application file for complete search history.

(56) References Cited

U.S. PATENT DOCUMENTS

| 1,669,113 A | 5/1928 | Wood |
| 4,365,180 A | 12/1982 | Licata et al. |
| 4,996,456 A * | 2/1991 | Strobl ............... 310/261 |
| 5,038,460 A | 8/1991 | Ide et al. |
| 5,065,063 A * | 11/1991 | Watanabe ............ 310/156.11 |

(Continued)

FOREIGN PATENT DOCUMENTS

EP 1 094 145 A2 4/2001

(Continued)

OTHER PUBLICATIONS

Partial European Search Report EP04257613.

*Primary Examiner*—Quyen Leung
*Assistant Examiner*—David W. Scheuermann
(74) *Attorney, Agent, or Firm*—McKenna Long & Aldridge LLP

(57) ABSTRACT

Direct coupling type motor for drum type washing machine having a stator which can reduce material required for fabrication, and a weight after fabrication, simplify a fabrication process, and can be mounted on a fixing side, such as a tub or a bearing housing securely, and a rotor which can enhance rigidity an outer rotor and protect a surface of the outer rotor.

10 Claims, 25 Drawing Sheets

U.S. PATENT DOCUMENTS

| | | | |
|---|---|---|---|
| 5,353,613 A | 10/1994 | Smith et al. | |
| 5,778,703 A * | 7/1998 | Imai et al. | 68/12.02 |
| 5,791,039 A * | 8/1998 | Tabuchi et al. | 29/602.1 |
| 5,907,206 A | 5/1999 | Shiga et al. | |
| 6,049,930 A | 4/2000 | Hisano et al. | |
| 6,127,760 A | 10/2000 | Nagasaki et al. | |
| 6,257,027 B1 * | 7/2001 | Imai | 68/12.12 |
| 6,396,177 B1 * | 5/2002 | Shin et al. | 310/63 |
| 2003/0146671 A1 | 8/2003 | Diehl et al. | |
| 2004/0068857 A1 | 4/2004 | Park et al. | |

FOREIGN PATENT DOCUMENTS

| | | | |
|---|---|---|---|
| EP | 1094144 | | 8/2001 |
| EP | 1428924 | | 6/2004 |
| GB | 2275134 | | 8/1994 |
| JP | 59011756 A | * | 1/1984 |
| JP | 2000-116037 | | 4/2000 |
| JP | 2000-166146 | | 6/2000 |
| JP | 2003-079080 | | 3/2003 |
| KR | 2001-37517 | | 10/1999 |
| KR | 1999-81171 | | 11/1999 |
| KR | 2001-37518 | | 5/2001 |

* cited by examiner

Stator (core)
Helical core (HC)

OUTER ROTOR TYPE MOTOR FOR DRUM TYPE WASHING MACHINE AND METHOD FOR FABRICATING THE SAME

CROSS-REFERENCE TO RELATED APPLICATIONS

This application is a divisional of U.S. patent application Ser. No. 11/008,407, filed Dec. 10, 2004, now U.S. Pat. No. 7,294,942, which claims priority to Korean Patent Application Nos. 2003-89721, 2003-89722, 2003-89723, 2003-89724 and 2003-89726 all filed Dec. 10, 2003, and all of which are incorporated by reference as if fully set forth herein.

BACKGROUND OF THE INVENTION

1. Field of the Invention

The present invention relates to drum type washing machines, and more particularly, to an outer rotor type BLDC motor applicable to a direct coupling type drum type washing machine, and a method for fabricating the same.

2. Discussion of the Related Art

In general, a drum type washing machine washes laundry by using a friction force between a drum rotated by a driving power of a motor and laundry in a state detergent, washing water, and the laundry are introduced into the drum, shows almost no damage to, and entangling of the laundry, and has pounding, and rubbing washing effects.

In the related art drum type washing machines, there are an indirect coupling type in which the driving power is transmitted from the motor to the drum through a belt wound on a motor pulley and a drum pulley indirectly, and a direct coupling type in which a rotor of a BLDC motor is coupled to the drum directly, to transmit the driving power from the motor to the drum, directly.

The type in which the driving power of the motor is transmitted to the drum, not directly, but indirectly through the motor pulley and the drum pulley, has much energy loss in the course of power transmission, and causes much noise in the course of power transmission.

According to this, for solving the problems of the indirect coupling type drum type washing machines, it is the present trend that use of the direct coupling type drum type washing machines with the BLDC motor is increasing, as example of which there are Korean Laid Open Patent Nos. 2001-37517, and 2001-37518.

A related art direct coupling type drum type drum type washing machine and a structure of a motor thereof will be described with reference to FIGS. 1 to 6, briefly. FIG. 1 illustrates a longitudinal section of a related art drum type washing machine.

Referring to FIG. 1, the related art drum type washing machine is provided with a tub 2 mounted on an inside of a cabinet 1, and a drum 3 rotatably mounted on a central portion of an inside of the tub 2. There is a motor in rear of the tub 2, wherein a stator 6 is secured to a rear wall of the tub, and a rotor 5 surrounds the stator 6, and is connected to the drum 3 with a shaft passed through the tub.

In the meantime, there are a door 21 mounted on a front of the cabinet 1, and a gasket 22 between the door 21 and the tub 2.

There are hanging springs 23 between an inside surface of an upper portion of the cabinet 1, and an upper portion of an outside circumferential surface of the tub 2, and a friction damper 24 between the inside surface of a lower portion of the cabinet 1, and a lower portion of the outside circumferential surface of the tub 2.

FIG. 2 illustrates a perspective exterior view of the stator in FIG. 1, and FIG. 3 illustrates a perspective view of a divisional type core DC applied to the stator in FIG. 2.

In a related art method for fabricating the core, a sheet of metal plate is pressed to form a unit core having Ts 151, a base portion 150, and projected portions 500 opposite to the Ts 151 each for forming fastening hole 500a therein, the unit cores are stacked to form a unit core assembly, and the unit core assemblies are connected to each other in a circumferential direction, to complete fabrication of the stator core, called the divisional core DC.

The projected portion 500 provides the fastening hole 620a for fastening the stator 6 to the rear wall of the tub, and serves to endure a fastening force of a bolt.

However, the method for fabricating the stator 6 by means of the divisional cores DC has, not only a complicate fabrication process, but also loss of much material.

Therefore, even if a helical type core HC is favorable, in which a sheet of steel plate having the Ts 151 and the base portions 150 is stacked turning in a helix for reducing the material loss, and making the fabrication process simple, since it is required to bend the sheet of metal punched out in a shape of a stripe into the helix, the helical core has a drawback in that the projected portion for fastening the stator to the tub can not be formed on an inner side of the core.

This is because, if the projected portion 500 is formed on the inner side of the core in fabrication of the helical core HC, a large width of the core at a portion having the projected portion formed thereon impedes bending of the core.

Therefore, currently, for employing the helical type core HC, a stator structure is required, in which a function the same with the projected portion of the divisional core DC is made to be carried out, not by the core itself, but by other portion.

For reference, a reason why it is important to secure an adequate rigidity of the projected portion having the fastening hole formed in for fastening the stator to the tub is as follows.

The washing machine in which the drum is directly rotated by the BLDC motor has the stator mounted on a rear portion of the tub, directly. In a case of the motor for a large capacity drum type washing machine with more than 1.5 kg of stator net weight, and a spinning speed in a range of 600~2000 RPM, it is liable that a fastened portion of the stator 6 is broken due to the stator weight, and vibration, shaking, and deformation of the rotor 5 in the high speed rotation.

Particularly, in a case of the drum type washing machine, in which the BLDC motor is used, and the stator 6 is secured to the tub rear wall, where an axis direction of the stator 6 is substantially parallel to ground, the vibration generated during operation of the washing machine causes intensive damage to the fastening portion of the stator 6 to the tub rear wall.

Thus, an adequate rigidity of the projected portion having the fastening hole formed therein is very important in fastening the stator 6 to the tub.

A related art outer rotor will be described with reference to FIGS. 5 and 6.

Referring to FIGS. 5 and 6, because the outer rotor R pressed of a steel plate (hereafter called as "steel plate rotor") has a stepped portion along a circumferential direction formed on a sidewall 120 extended from a circumference of a bottom 110 of the rotor frame 100 perpendicular to a bottom 100 surface, to support magnets M when the magnets M are attached to an inside surface of the sidewall 120 of the rotor frame 100, fabrication of the outer rotor is easy.

Moreover, there are a plurality of radial cooling fins 130 around a center portion of the bottom 110 of the rotor frame 100 of the steel plate rotor R to blow air toward the stator (not shown) to cool down heat generated at the stator.

The cooling fins 130 are lanced toward an opened side of the rotor, and openings formed by the lancing serve as vent holes.

There are embossed portions 150 between adjacent cooling fins 130 on the bottom 110 of the rotor frame 100 for reinforcing strength of the rotor, and there are drain holes 160 in the embossed portions 150 for draining water.

However, the related art steel plate rotor R has the following problems.

Despite of anti-rusting heat treatment of a surface of the related art steel plate rotor R, rust occurs on a portion of the surface scratched during transportation or other situations.

The surface of the rotor also corrodes due to chemical reaction of detergent stuck to the surface of the rotor as the drum type washing machine is used for a long time.

In the meantime, during the spinning for water extraction, the sidewall 120 of the related art steel plate rotor 100 throbs intensely due to electro-magnetic interaction (attraction and repulsion) with the stator, leading to increase noise.

SUMMARY OF THE INVENTION

Accordingly, the present invention is directed to an outer rotor type BLDC motor for a drum type washing machine, and a method for fabricating the same that substantially obviates one or more problems due to limitations and disadvantages of the related art.

An object of the present invention is to provide an outer rotor type BLDC motor for a drum type washing machine, which has a stator that can reduce material and weight required for fabrication, has a simple fabrication process, and can be mounted on a fixed side, such as a tub or a bearing housing securely.

Another object of the present invention is to provide a new stator structure which can be mounted on a fixed side, such as a tub or a bearing housing securely while reducing material for fabrication as described before so as to be suitable for a BLDC motor of a drum type washing machine, which has a weight over 1.5 kg only of the stator, and a rotation speed varying 0~2,000 RPM or over.

Another object of the present invention is to provide an outer rotor type BLDC motor for a drum type washing machine, which can prevent scratch on a surface of the steel plate outer rotor from occurring effectively, and cut off reaction of the surface with detergent effectively, for extending a lifetime of the motor, and improving reliability.

A further object of the present invention is to provide an outer rotor type BLDC motor for a drum type washing machine, which can enhance a rigidity of the outer rotor, to solve the problem of throbbing and consequential noise.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an outer rotor type motor for a drum type washing machine includes an annular stator core having multiple layers formed by winding a base portion in a shape of stripe with Ts projected from the base portion in a helix starting from a bottom layer to a top layer, an insulator insert molded to cover an outside surface of the stator core for insulating the stator core electrically, and fastening portions formed as one body with the insulator each projected from an inside circumferential surface of the stator core toward a center of the stator, for fixedly securing the stator to the tub, wherein the base portion of the stator core has an arc shaped slots each for reducing stress in winding the core as well as serving as a portion of a fastening hole, and each of the fastening portion of the insulator formed to cover the slots has a fastening hole formed therein.

In another aspect of the present invention, an outer rotor type motor for a drum type washing machine includes an annular stator core having multiple layers formed by winding a steel plate with a stripe shape of base portion and Ts projected from the base portion in a helix starting from a bottom layer to a top layer such that a layer overlaps with a next layer, an upper insulator of an electric insulating material covered on an upper side of the stator core in a shape complementary to a shape of the stator core, and a lower insulator of an electric insulating material covered on a lower side of the stator core at the time of assembly with the upper insulator in a shape complementary to a shape of the stator core, wherein each of the upper insulator and the lower insulator includes three or more than three fastening portions formed as one body therewith projected from an inside of the stator core toward a center of the stator for fastening the stator to a fixing side of the tub, and the fastening portion has a fastening hole for securing the stator to a tub wall with fastening members.

In another aspect of the present invention, an outer rotor type motor for a drum type washing machine includes an annular stator core having multiple layers formed by winding a steel plate with a stripe shape of base portion and Ts projected from the base portion in a helix starting from a bottom layer to a top layer such that a layer overlaps with a next layer, an upper insulator of an electric insulating material covered on an upper side of the stator core in a shape complementary to a shape of the stator core, and a lower insulator of an electric insulating material covered on a lower side of the stator core at the time of assembly with the upper insulator in a shape complementary to a shape of the stator core, wherein each of the upper insulator and the lower insulator includes three or more than three fastening portions formed as one body therewith projected from an inside of the stator core toward a center of the stator for fastening the stator to a fixing side of the tub, the fastening portion has a boss of a fastening hole for securing the stator to a tub wall, and there is a cylindrical metal placed around the boss.

In another aspect of the present invention, an outer rotor type motor for a drum type washing machine includes an annular stator core having multiple layers formed by winding a steel plate with a stripe shape of base portion and Ts projected from the base portion in a helix starting from a bottom layer to a top layer such that a layer overlaps with a next layer, an upper insulator of an electric insulating material covered on an upper side of the stator core in a shape complementary to a shape of the stator core, and a lower insulator of an electric insulating material covered on a lower side of the stator core at the time of assembly with the upper insulator in a shape complementary to a shape of the stator core, annular supporters respectively inserted in the upper insulator and the lower insulator; wherein each of the upper insulator and the lower insulator, and the supporters inserted therein includes fastening portions projected from an inside of the stator core toward a center of the stator for fastening the stator to a fixing side of the tub, and the fastening portion has a fastening hole for securing the stator to a tub wall with fastening members.

In further aspect of the present invention, an outer rotor type motor for a drum type washing machine includes a stator core stacked by winding in a helix, an insulator of an insulating material having an upper side piece, and a lower side piece to cover the core when the upper side piece, and the lower side piece are joined together, an annular supporter of metal inserted in at least one of the upper insulator and the lower insulator, and fastening portions formed as one body with the upper, and lower insulators, and/or the supporter inserted therein, each of the fastening portions being projected from an inside of the stator core toward a center thereof for securing the stator to a fixing side of the tub.

In still further aspect of the present invention, an outer rotor type motor for a drum type washing machine includes an outer rotor of steel plate having a bottom, a sidewall extended from the bottom in perpendicular thereto substantially, and magnets on an inside of the sidewall, wherein the rotor frame and a back yoke are formed as one unit so that the rotor frame also serves as the back yoke, and the rotor frame has one coat of synthetic resin applied to at least an outside surface of the rotor frame.

In the meantime, in still further aspect of the present invention, an outer rotor type motor for a drum type washing machine includes an outer rotor of steel plate having a bottom, a sidewall extended from the bottom in perpendicular thereto substantially, and magnets on an inside of the sidewall, wherein an annular back yoke is mounted on an inside surface of the sidewall of the outer rotor, and the magnets are attached to an inside surface of the back yoke.

In still yet further aspect of the present invention, a method for fabricating an outer rotor type motor for a drum type washing machine includes the steps of forming an annular stator core having multiple layers formed by winding a steel plate with a stripe shape of base portion and Ts projected from the base portion in a helix starting from a bottom layer to a top layer such that a layer overlaps with a next layer, insert molding the stator core such that an insulating material covers the stator core, and an inside of a slot forms a portion of a fastening hole, and winding coils on Ts of the stator coil.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings FIGS. 7 to 34. Wherever possible, the same reference numbers will be used throughout the drawings to refer to the same or like parts.

A first embodiment of the present invention will be described.

Figure 1:
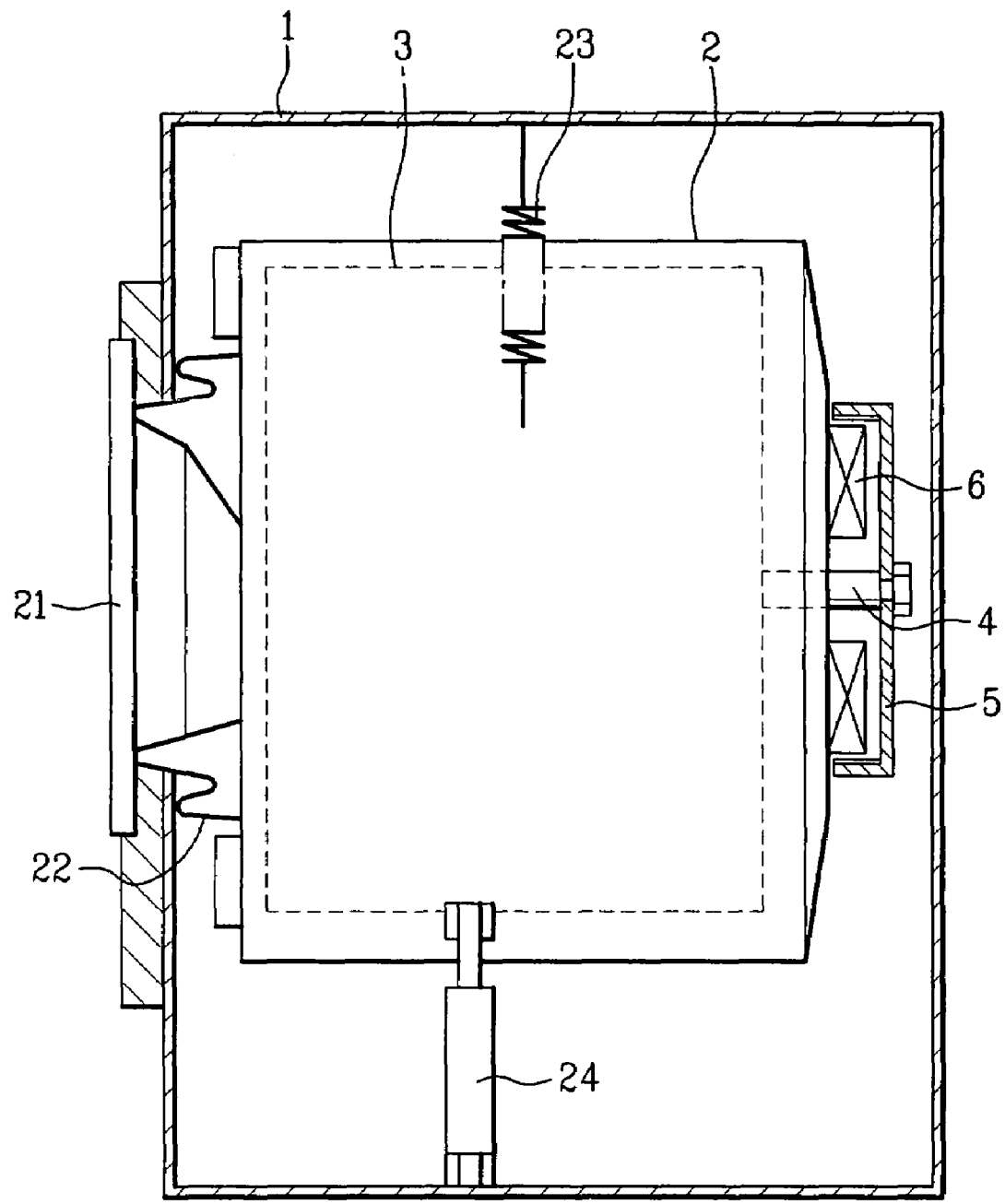
FIG. 1 illustrates a longitudinal section of a related art direct coupling type drum type washing machine, schematically.
Figure 2:
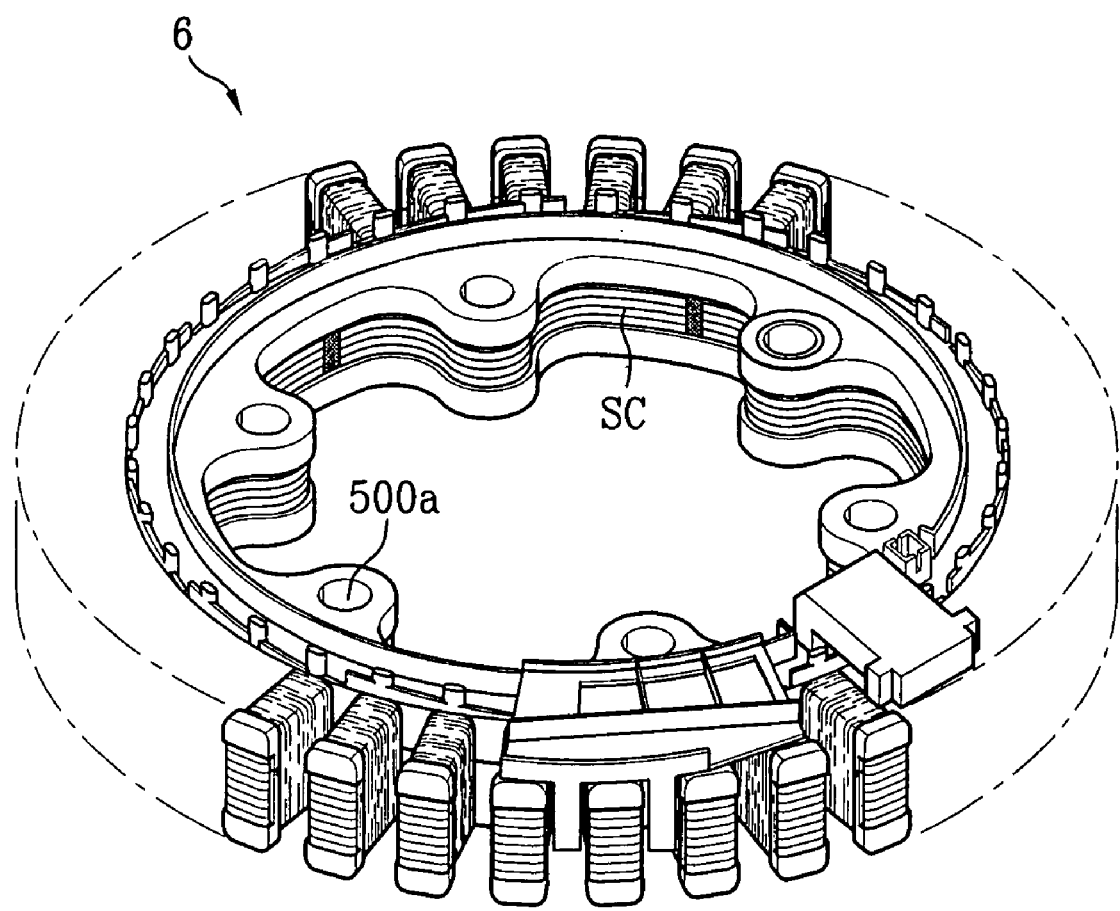
FIG. 2 illustrates a perspective view of an exterior of the stator in FIG. 1.
Figure 3:
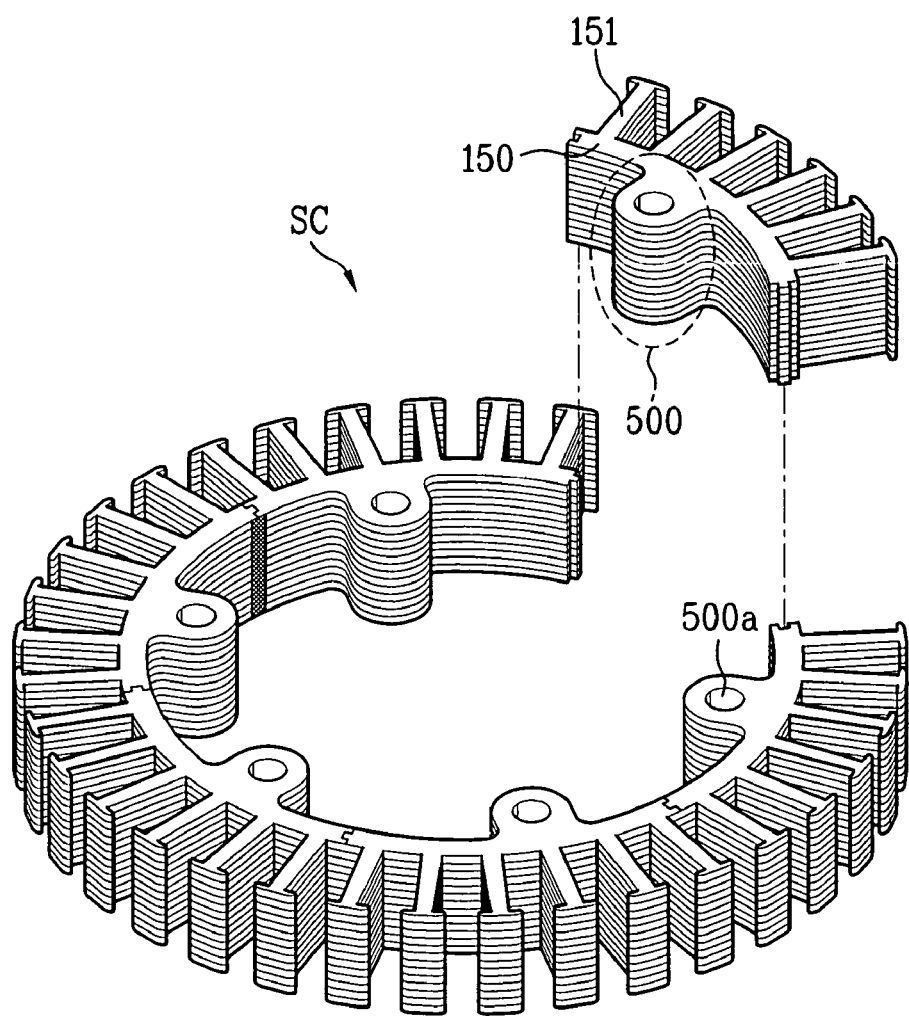
FIG. 3 illustrates a perspective view of the divisional core in FIG. 2.
Figure 4:
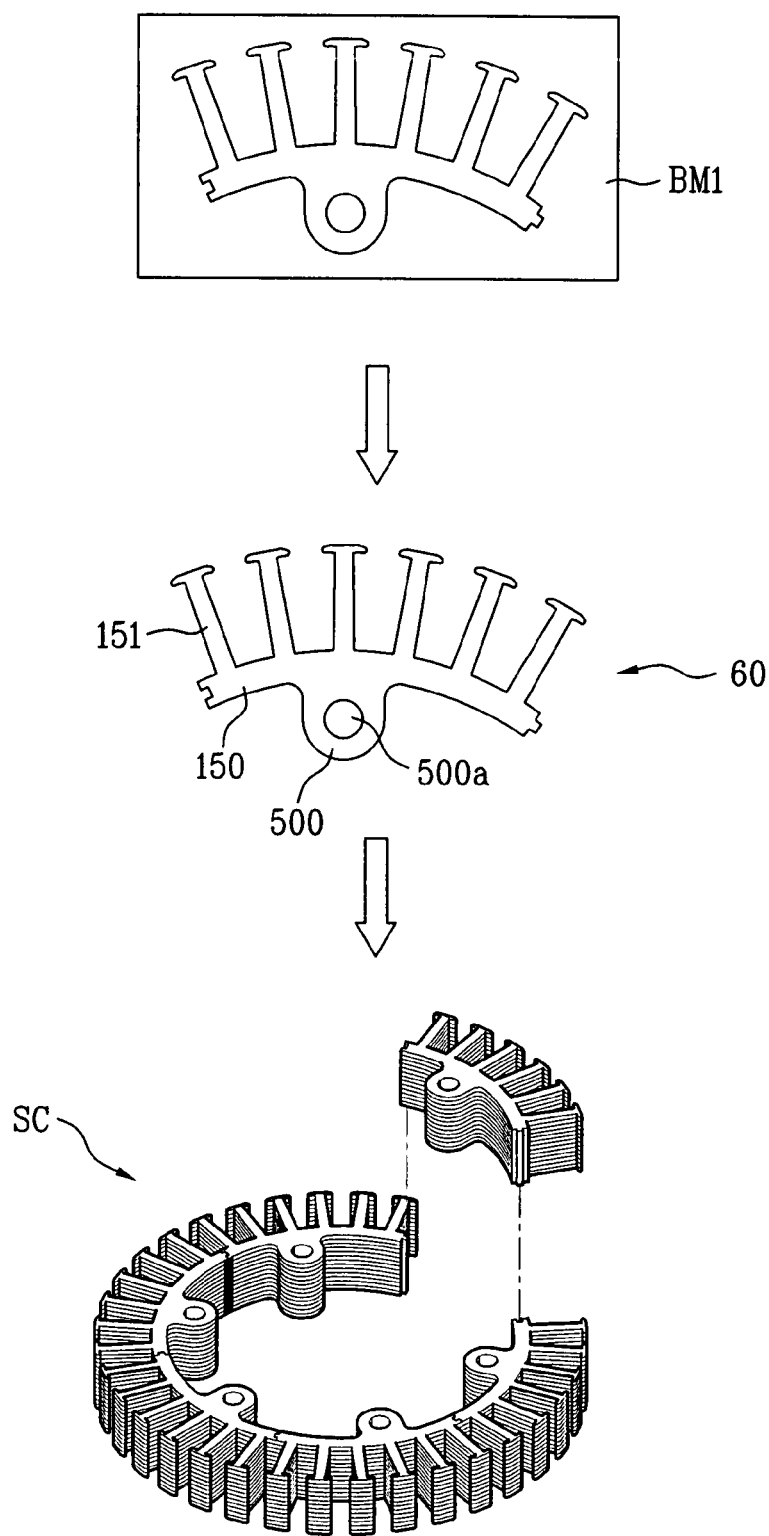
FIG. 4 illustrates a reference drawing showing a fabrication process of the divisional core in FIG. 3.
Figure 5:
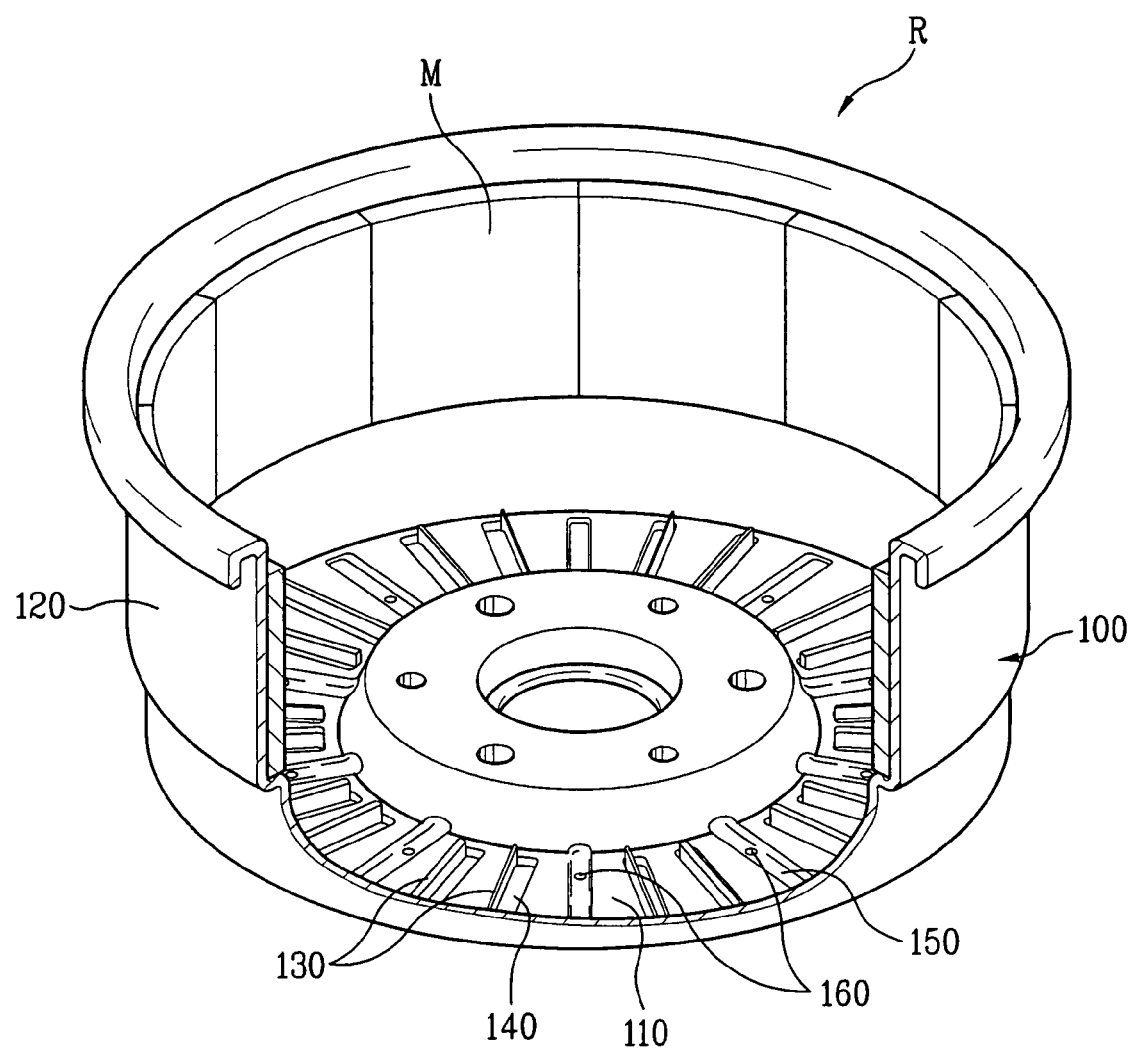
FIG. 5 illustrates a perspective view of the outer rotor in FIG. 1, with a partial cut away view.
Figure 6:
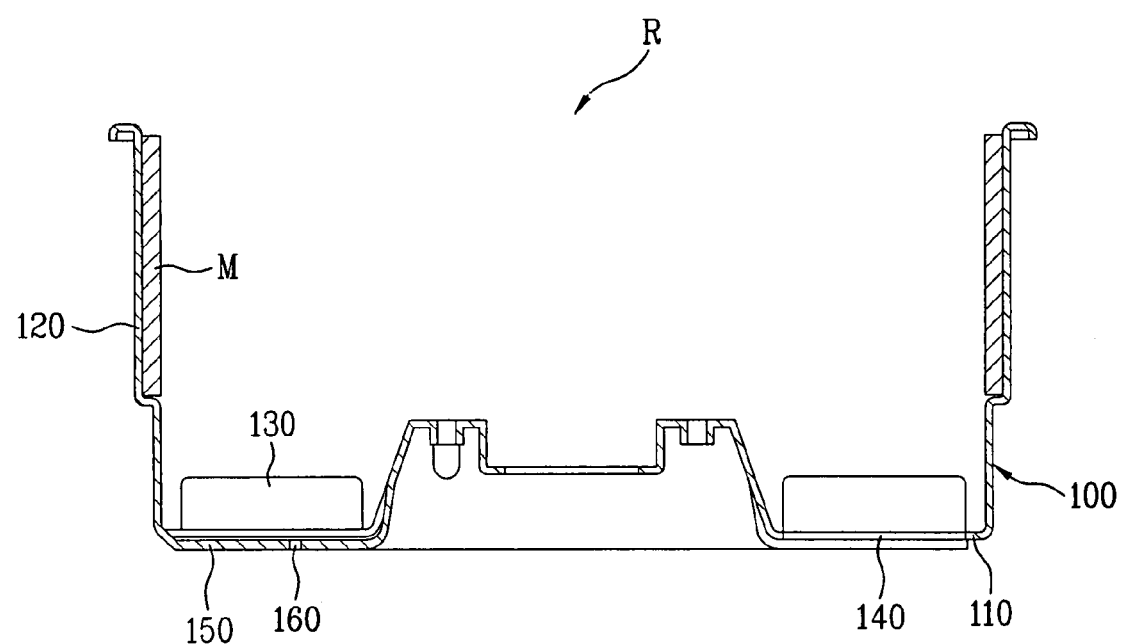
FIG. 6 illustrates a section of FIG. 5.
Figure 7:
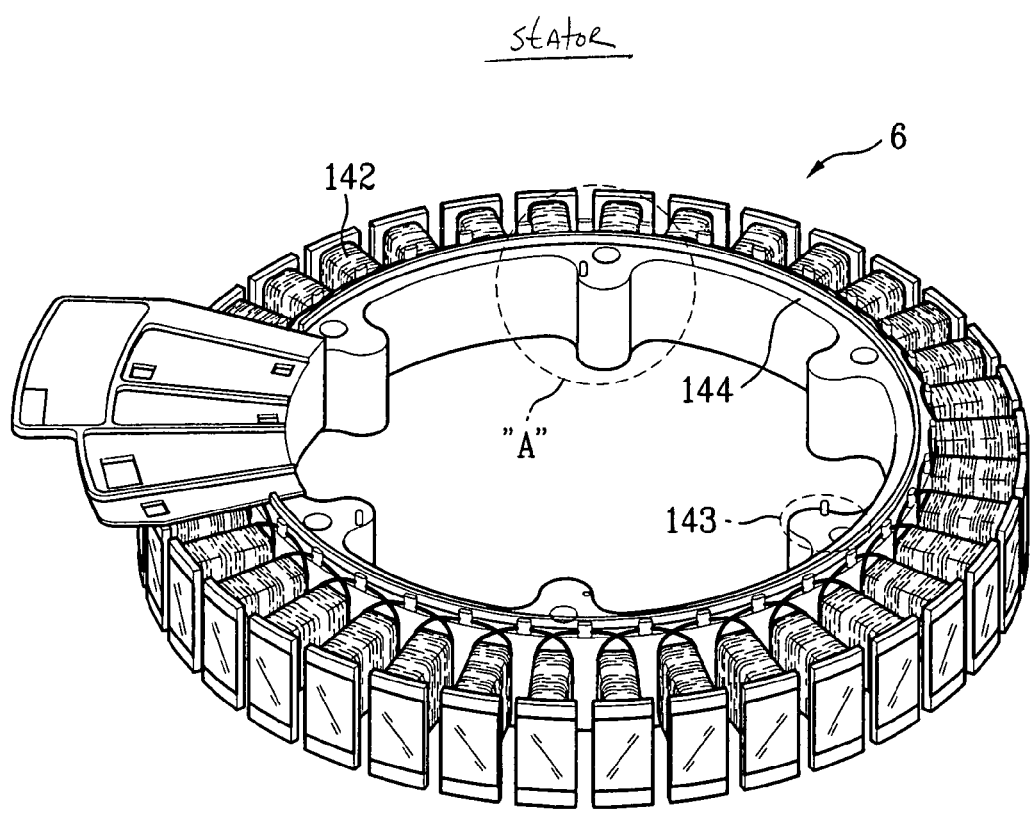
FIG. 7 illustrates a perspective view of an exterior of the stator in accordance with a first preferred embodiment of the present invention.
Figure 8:
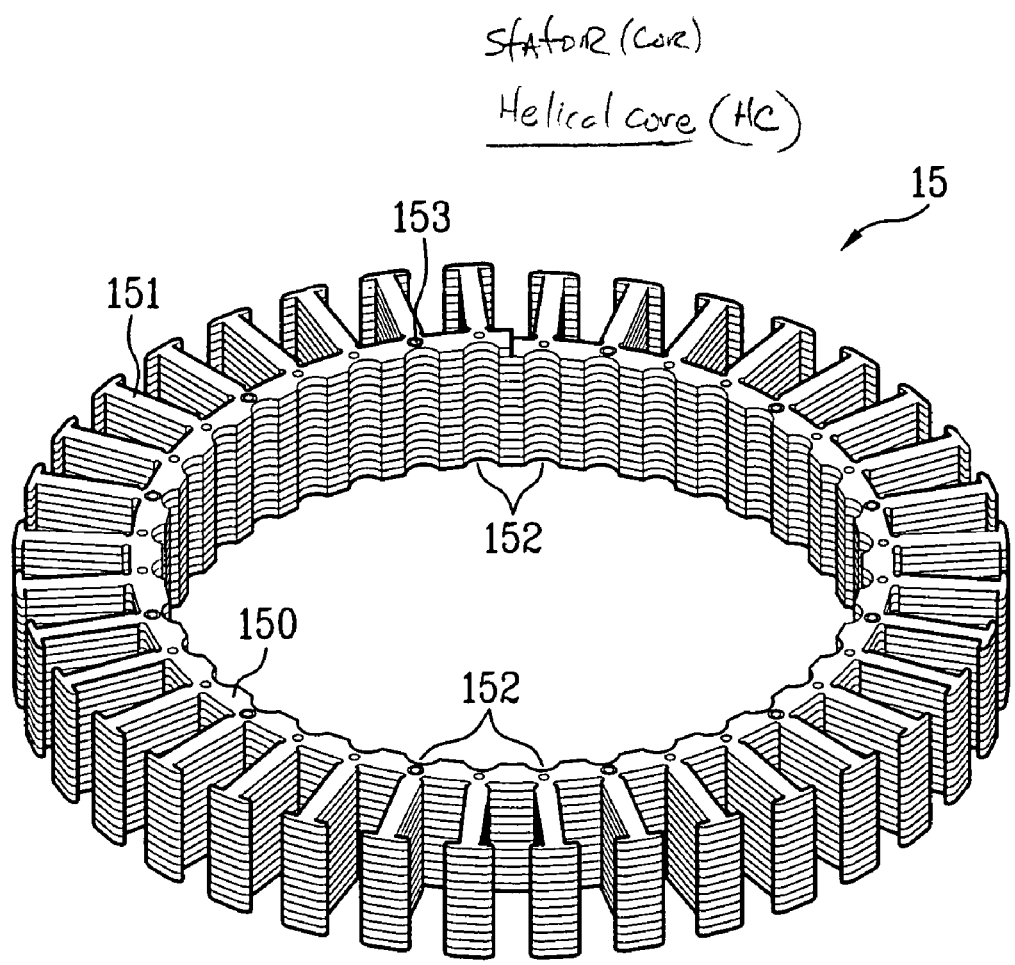
FIG. 8 illustrates a perspective view of the core in the stator in FIG. 7.
Figure 9:
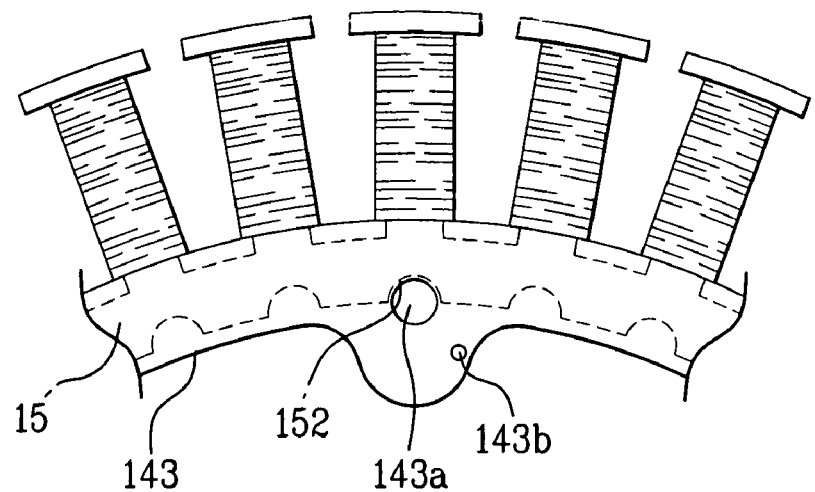
FIG. 9 illustrates a plan view of key portions of FIG. 7.
Figure 10:
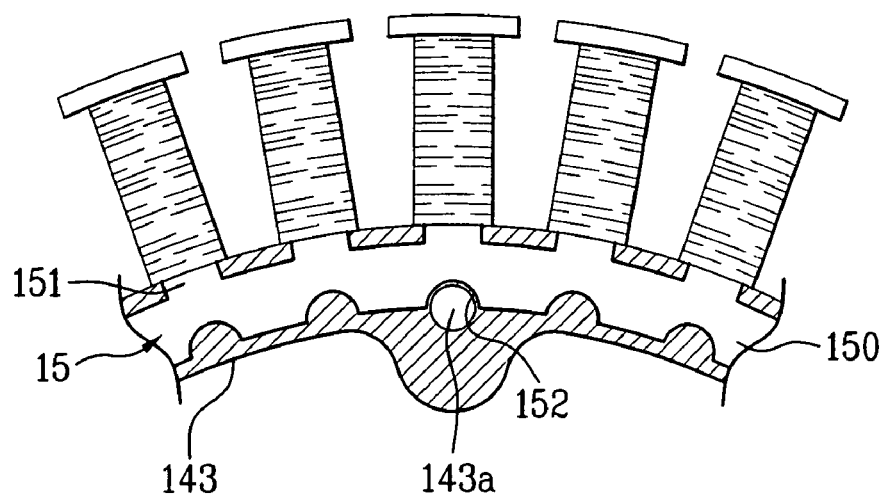
FIG. 10 illustrates a cross sectional view of FIG. 9, showing an inside of a fastening portion for reference.

FIG. 7 illustrates a perspective view of an exterior of the stator in accordance with a first preferred embodiment of the present invention, FIG. 8 illustrates a perspective view of the core in the stator in FIG. 7, FIG. 9 illustrates a plan view of key portions of FIG. 7, and FIG. 10 illustrates a cross sectional view of FIG. 9, showing an inside of a fastening portion for reference.

The stator 6 of a direct coupling type motor in accordance with a first preferred embodiment of the present invention includes an annular stator core 15 having multiple layers formed by winding a steel plate with Ts 151 and base portion 150 in a helix starting from a bottom layer to a top layer such that a layer overlaps with the next layer, an insulator 144 insert molded to cover an outside surface of the stator core for insulating the stator core electrically, and three or more fastening portions 143 formed as one body with the insulator 144 each projected from an inside circumferential surface of the stator core 15 toward a center of the stator 6, for fixedly securing the stator 6 to the tub 2, wherein the base portion 150 of the stator core 15 has arc shaped slots 152 each for reducing stress in winding the core as well as serving as a portion of a fastening hole 143*a*, and each of the fastening portion 143 of the insulator 144 formed to cover the slots 152 has a fastening hole 143*a* formed therein.

A process for fabricating the stator in accordance with a preferred embodiment of the present invention will be described.

A Core having the stripe shaped base portion 150 with the arc shaped slots 152, and Ts 151 projected from the base portion 150 is punched from an electric sheet, a base metal. In this instance, of the core is straight.

Then, the punched core is wound in a helix from a bottom layer to a top layer such that a layer overlaps with the next layer, to form a multiple layered annular stator core 15.

In view of a geometric characteristic, the stator core 15 is also called as a helical core HC, and the multiple layers thereof are fastened with rivets 153 passed through pass through holes in the base portion 150.

The arc shaped slots 152 reduce stress during winding the core, enabling to wind the core with a smaller force.

Then, an insert molding is performed to cover the stator core 15 with an insulating material, such as plastic, or the like.

The insulating material covers the stator core 15 such that an inside of the slot 152 forms a portion of the fastening hole 143*a*.

That is, in an inside direction of the slot 152, there is the fastening portion 143 of the insulator 144, and the fastening portion has a bolt fastening hole 143*a*.

After finishing the insert molding, a coil is wound around each of the Ts 151 of the core 15.

The foregoing stator core in accordance with a first preferred embodiment of the present invention works as follows.

Different from the divisional core, the application of so called helical core HC, formed by stacking a steel plate having Ts 151 and a base portion 150 while winding in a helix, to the embodiment as the stator core 15 permits the embodiment to omit steps of aligning, and welding the core segments, to simplify a fabrication process.

Moreover, different from the divisional core, since the stator core 15 has no projected portion, the stator core 15 permits to reduce waste of material.

That is, the method for fabricating a stator in accordance with the embodiment not only has a simple fabrication process, but also permits to reduce waste of material.

Furthermore, by improving structures of the stator core 15 and the insulator 144, the stator 6 has an adequate rigidity against bolt fastening force even is the stator 6 has no projected portion on the core itself like the divisional core DC.

That is, the arc shaped slot 152 is formed in an inside surface of the helical type stator core, and the insulator 144 is formed on an exterior of the core by insert molding, wherein the insulator 144 on the exterior of the core forms a circular hole together with the arc shaped slot on the inside of the core.

That is, since the stator core 15 has a shape of a helical core HC with an inside of the slot 152 being a portion of the bolt fastening hole 143*a*, at the time of bolt fastening for securing the stator 6 to the tub 2, a portion of bolt head of the bolt presses down an upper surface of the insert molded core, and rest of the bolt head presses down an upper surface of the fastening portion 143 of the insulator 144.

According to this, the stator 6 can effectively prevent a fastening portion of the stator 6 suffering from breakage caused by vibration at the spinning, and shaking and deformation of the rotor 5 even at a large capacity drum type washing machine having a weight over 1.5 kg only of the stator, and a spinning speed ranging 600~2,000 RPM.

As a positioning projection 143*b* in the vicinity of the fastening hole 143*a* of the fastening portion 143 fits in a positioning hole (not shown) in the tub 2, fastening of the stator 6 is easy.

Thus, the positioning projection enables an easy assembly of the stator 6 with the tub 2, and a serviceman to make an easy repair at the time of after service.

Of course, the positioning projection may be formed on the tub 2, and the positioning hole may be formed in the fastening portion 143.

Figure 11:
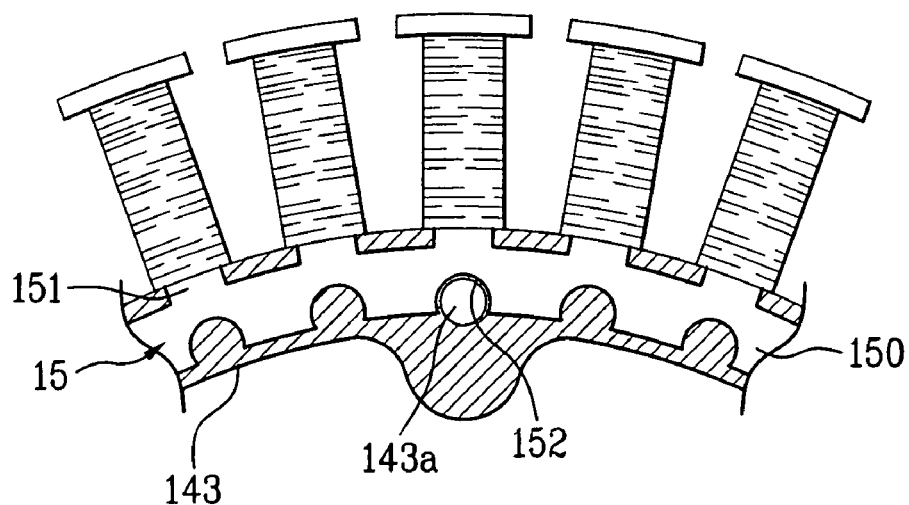
FIGS. 11 and 12 illustrate cross sectional views equivalent to FIG. 10, showing key portions of slots in accordance with another preferred embodiments of the present invention.
Figure 12:
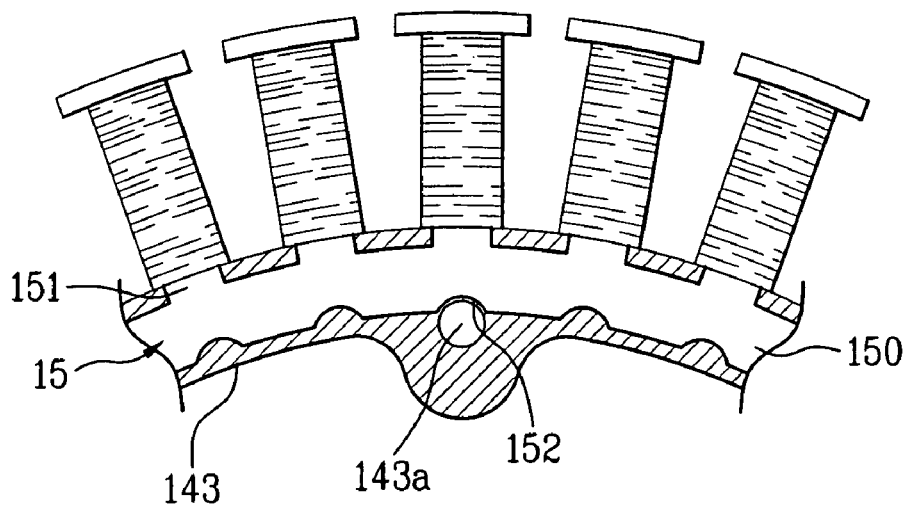

FIGS. 11 and 12 illustrate cross sectional views equivalent to FIG. 10, showing key portions of slots in accordance with another preferred embodiments of the present invention, wherein it can be noted that the slot 152 in the base portion 150 of the stator core 15 may be greater than a semicircle as shown in FIG. 11 or smaller than semicircle as shown in FIG. 12.

In other words, a center of a radius of the slot 152 may be positioned on an inside, or outside of the slot.

That is, more than one half of an area of the fastening hole 143*a* may be positioned on an inside of the slot as shown in FIG. 11, or on an outside of the slot as shown in FIG. 12.

In a case of FIG. 11, a contact area between the bolt head and the stator core 15 is large, to increase a supporting force against the bolt fastening force.

Moreover, the case permits an easy bending of the core at the time of winding the stator core in a helix.

A case of FIG. 12 is applicable to a general small sized motor because the contact area between the bolt head and the stator core 15 is small, to reduce the supporting force against the bolt fastening force.

Along with this, in the vicinity of the fastening hole 143*a* of the fastening portion, there is a positioning projection 143*b* in complementary to a positioning hole (not shown) in the tub 2.

A second preferred embodiment of the present invention will be described with reference to FIGS. 13~19.

Figure 13:
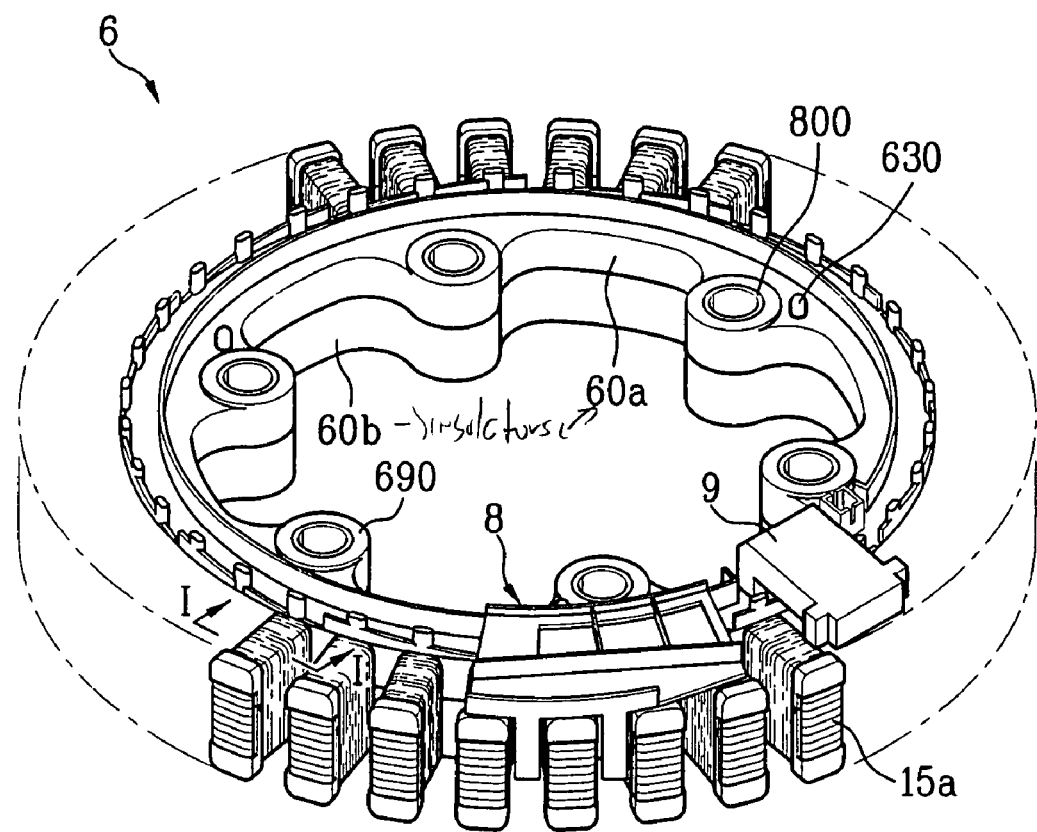
FIG. 13 illustrates an exterior perspective view of a stator in accordance with a second preferred embodiment of the present invention.
Figure 14:
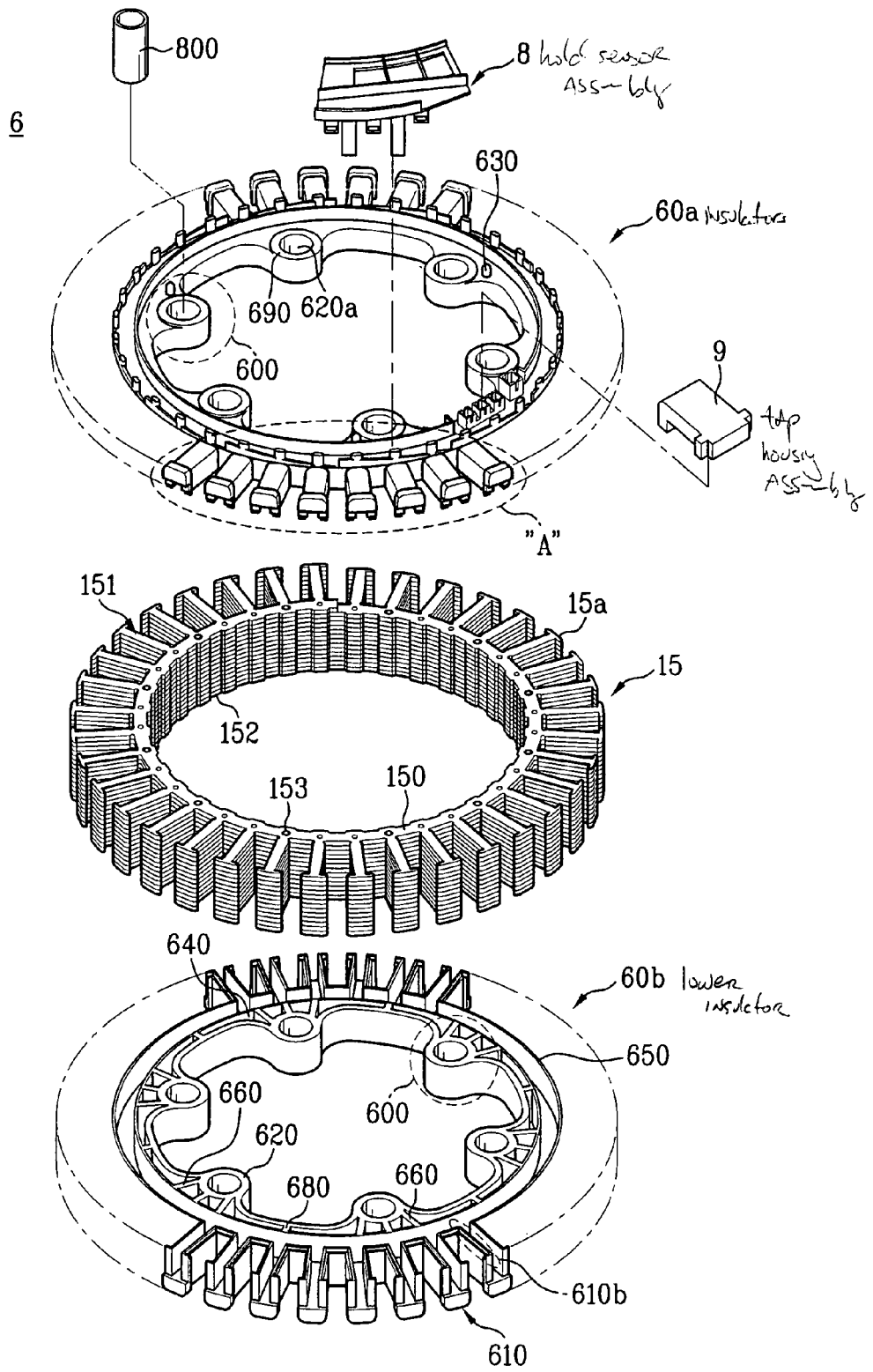
FIG. 14 illustrates a disassembled perspective view of FIG. 13.
Figure 15:
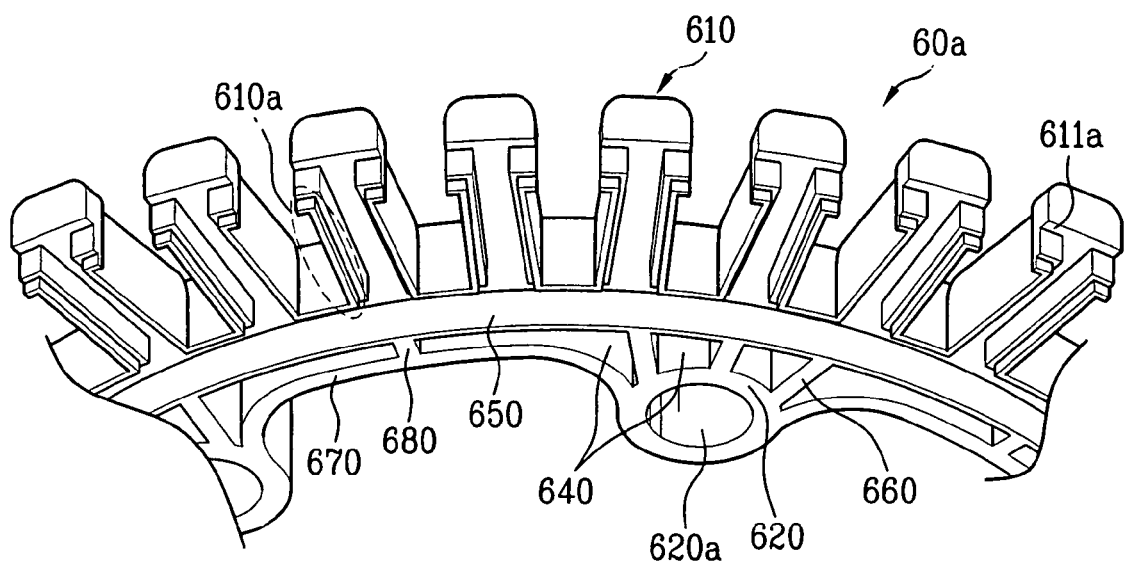
FIG. 15 illustrates a bottom perspective view of a portion of the upper insulator in FIG. 14.
Figure 16:
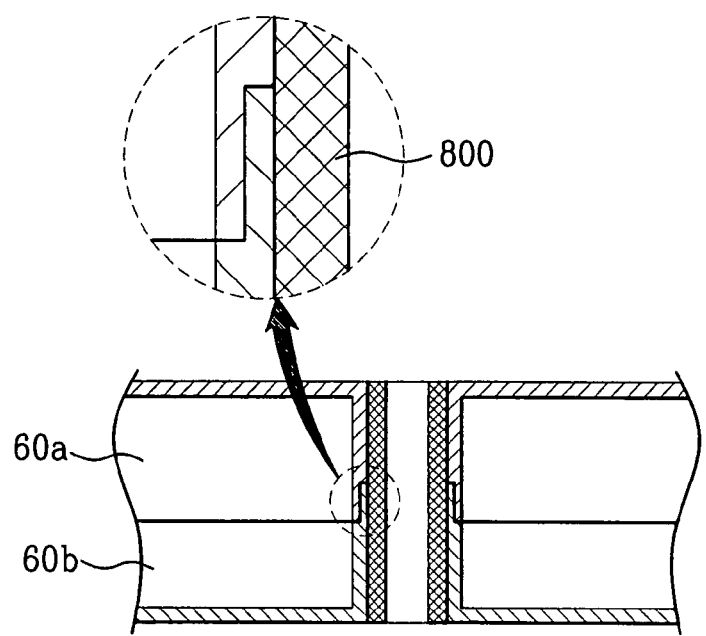
FIG. 16 illustrates a section showing a fastening portion across a line I-I in FIG. 13.

FIG. 13 illustrates an exterior perspective view of a stator in accordance with a second preferred embodiment of the present invention, FIG. 14 illustrates a disassembled perspective view of FIG. 13, FIG. 15 illustrates a bottom perspective view of a portion of the upper insulator in FIG. 14, and FIG. 16 illustrates a section showing a fastening portion across a line I-I in FIG. 13.

The stator 6 of an outer rotor type motor in accordance with a second preferred embodiment of the present invention includes an annular stator core 15 having multiple layers formed by winding a steel plate with a stripe shape of base portion 150 and Ts 151 projected from the base portion 150 in a helix starting from a bottom layer to a top layer such that a layer overlaps with a next layer, an upper insulator 60*a* of an electric insulating material covered on an upper side of the stator core 15 in a shape complementary to a shape of the stator core 15, and a lower insulator 60*b* of an electric insulating material covered on the lower side of the stator core 15 at the time of assembly with the upper insulator 60*a* in a shape complementary to a shape of the stator core 15, wherein each of the upper insulator 60*a* and the lower insulator 60*b* includes three or more than three fastening portions 600 formed as one body therewith projected from an inside of the stator core 15 toward a center of the stator 6 for fastening the stator 6 to a fixing side of the tub.

The fastening portion 600 (see FIG. 14) has a fastening hole 620a (see FIG. 15) for securing the stator 6 to a fixing side, such as the tub, with a fastening member. The fastening hole 620a is constructed of a boss 620 projected to a back side of the fastening portion 600.

Each of the upper insulator 60a and the lower insulator 60b has a supporting rib 650 on an inside along a circumferential direction thereof in contact with the stator core 15 for supporting an inside surface of the core.

The fastening portion 600 of each of the upper insulator 60a and the lower insulator 60b has at least one reinforcing rib 660 connected between the boss 620 of the fastening hole 520a and the supporting rib 650 for spreading fastening force concentrated on the boss 620 and reinforcing a strength of the fastening portion 600.

In the meantime, the fastening portion 600 of each of the upper insulator 60a and the lower insulator 60b has a reinforcing rib 670 at an inside circumference thereof, and at least one connection rib 680 connected between the reinforcing rib 670 and the supporting rib 650 which supports an inside surface of the core in a radial direction, for providing a supporting force.

The reinforcing rib 670, together with the reinforcing rib 660, connects between the bosses 620 having fastening holes of the upper, and lower insulators, to spread the fastening force concentrated on the boss, and reinforce a strength of the fastening portion 600.

In the meantime, each of the upper insulator 60a and the lower insulator 60b has tips 610a and 610b on opposite sidewalls of each of the Ts 610 thereof having shapes in complementary to each other for fitting in at the time of assembly to form a flush surface.

Each of the tips 610a and 610b on each of the Ts 610 has a "└─" shape if the other side has a "─┐" shape.

At the opposite end surfaces substantially perpendicular to the opposite sidewall surfaces of the teeth 610 of the upper insulator 60a and the lower insulator 60b, there are also the tips 610a and 610b having shape in complementary to each other.

The teeth 610 of each of the upper insulator 60a and the lower insulator 60b has a seating surface 611a at an end for seating a core shoe 151a of the stator core 15.

Along with this, in the vicinity of the fastening hole 620a of the fastening portion 600 of the upper insulator 60a, there is a positioning projection 630 having a shape in complementary to a positioning hole or a slot (not shown) in the fixing side of the tub.

There is a cylindrical metal 800 in the fastening hole 620a, a spring pin having an elasticity owing to an incised portion, or a hollow pin enabling press fit in the fastening hole 620a, serves as a bushing.

In the meantime, the fastening hole 620a of each of the upper insulator 60a and the lower insulator 60b has a land around the fastening hole 620a for preventing the bolt head from being brought into direct contact with the cylindrical metal 800 at the time of bolt fastening.

The base portion 150 of the stator core 15 has slots 152 for reducing stress at the time of winding in formation of the core to make the winding easy, and the multiple layers thereof are fastened with rivets 153 passed through pass through holes in the base portion 150.

In FIG. 14, an unexplained reference numeral 8 denotes a hole sensor assembly for controlling the motor, and 9 denotes a tap housing assembly for tapping power to supply the power to a stator side.

The work of the second embodiment stator will be described.

Different form the divisional core DC, the application of so called helical core HC, formed by stacking a steel plate having Ts 151 and a base portion 150 while winding in a helix, to the embodiment as the stator core 15 also permits the embodiment to omit steps of aligning, and welding the core segments, to simplify a fabrication process.

Moreover, different from the divisional core, since the stator core 15 has no projected portion, the stator core 15 permits to reduce waste of material.

That is, a method for fabricating a stator of the embodiment not only simplifies a fabrication process, but also reduces waste of material.

Moreover, even if the stator 6 of the embodiment improves structures of the upper, and the lower insulator 60a, and 60b such that no projected portions are formed at the core itself for supporting the fastening force at the time of fastening the stator 6 to the tub side, the stator 6 still has a rigidity enough to support the bolt fastening force.

That is, by providing structures that work the same with the projected portion of the divisional core to the fasting portions 600 of the upper, and lower insulators 60a, and 60b, a stator 6 can be provided, to which the helical core HC is applicable.

Moreover, spaces 640 between the ribs 650, 660, 670, and 680 at a back side of the fastening portion 600 dampen and attenuate vibration occurred during driving the motor, to improve mechanical reliability of the stator 6, and contributes to save material of the insulators.

The supporting ribs 650 of the upper insulator 60a and the lower insulator 60b formed at an inside in contact with the stator core 15 along the circumferential direction support an inside surface of the stator core 15.

The reinforcing rib 660 connected between the boss 620 of the fastening hole 620a and the supporting rib 650 at each of the fastening portion 600 of the upper insulator 60a and the lower insulator 60b spreads the fastening force concentrated on the boss 620, and reinforces a strength of the fastening portion 600.

According to this, the stator 6 can effectively prevent a fastening portion of the stator 6 suffering from breakage caused by vibration at the spinning, and shaking and deformation of the rotor 5 even at a large capacity drum type washing machine having a weight over 1.5 kg only of the stator, and a spinning speed ranging 600~2,000 RPM.

As a positioning projection 630, or 143b in the vicinity of the fastening hole 620a of the fastening portion 600 fits in a positioning hole (not shown) in the tub 2, fastening of the stator 6 is easy.

Thus, the positioning projection enables an easy assembly of the stator 6 with the tub 2, and a serviceman to make an easy repair at the time of after service.

Of course, the positioning projection 630 may be formed on the tub 2, and the positioning hole may be formed in the fastening portion 600.

Figure 17:
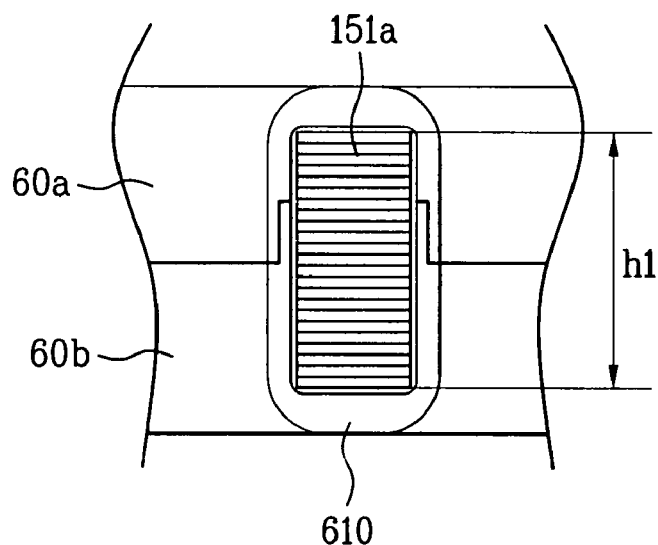
FIGS. 17 and 18 are reference drawings, illustrating a versatility of application of the insulators.
Figure 18:
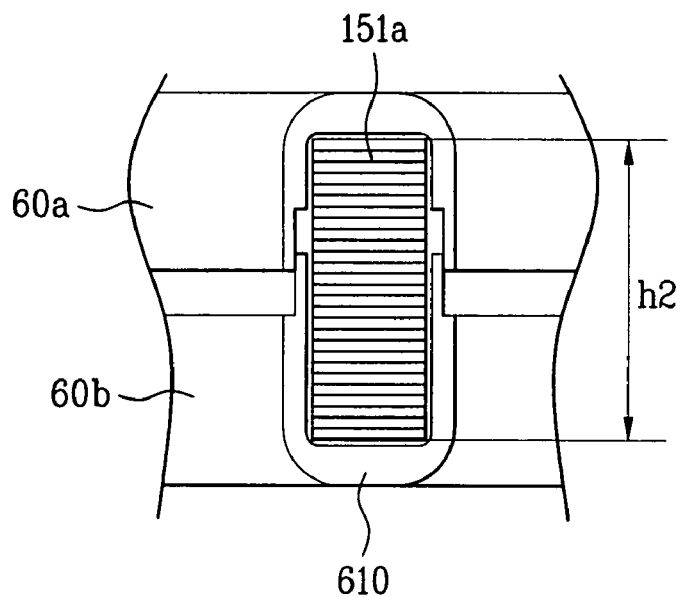

In the meantime, FIGS. 17 and 18 are reference drawings, illustrating a versatility of application of the insulators, wherein it can be noted that the upper, and lower insulators 60a and 60b are applicable even if a total height of the helical core varies within a certain range.

That is, FIG. 17 illustrates a case when a total height h1 of the core is a height which permits tips 610a and 610b of the upper, and lower insulators 60a and 60b fit exactly, and FIG. 18 illustrates a case when a total height of the core is a height greater than a case of FIG. 17 such that the tips 610a (see FIGS. 14 and 15) and 610*b* (see FIG. 15) of the upper, and lower insulators 60*a* and 60*b* unable to fit exactly, but spaced a certain distance.

Even if the total height h2 of the core is greater than a height that permits the tips 610*a* and 610*b* of the upper, and lower insulators 60*a* and 60*b* fit exactly, such that there is a space between the tips 610*a* and the 610*b*, because the insulation against the core Ts is still achievable, the upper, and lower insulators 60*a* and 60*b* are applicable to the case of FIG. 18, too.

Thus, since the separate type upper, and lower insulators of the embodiment are applicable to the core regardless of the total height of the core within a certain range of the total height, the separate type upper, and lower insulators of the embodiment can improve workability on an assembly line.

Figure 19:
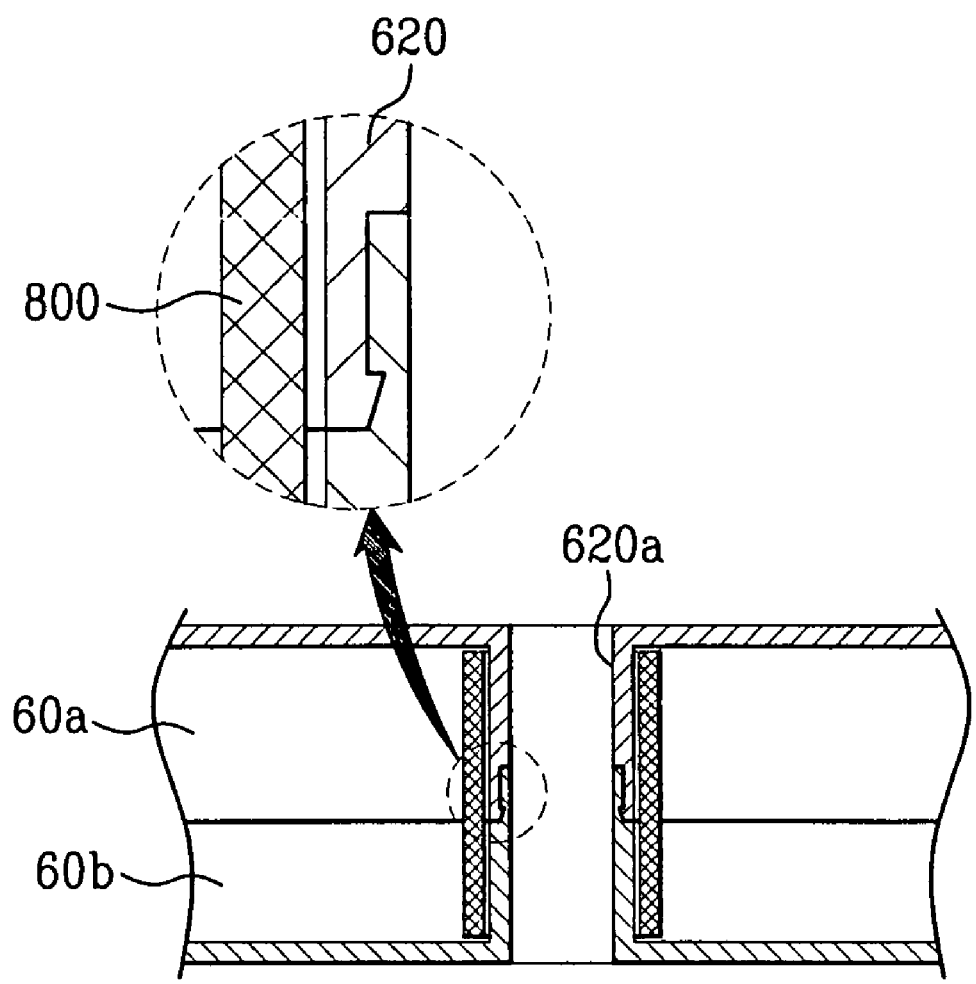
FIG. 19 illustrates a section of a fastening portion corresponding to FIG. 16 in accordance with another preferred embodiment.

FIG. 19 illustrates a section of a fastening portion corresponding to FIG. 16 in accordance with another preferred embodiment, wherein a cylindrical metal 800 is mounted on an outside of the boss 620 of the fastening hole 620*a* in the fastening portion 600 of each of the upper, and lower insulators 60*a*, and 60*b*.

That is, in this embodiment, a boss 620 of the fastening hole 620*a* which is formed to secure the stator 6 to a fixing side, such as the tub, is formed on a back side of the upper and lower insulators 60*a*, and 60*b*, and a cylindrical metal 800 is placed around the boss. This placement of the cylindrical metal on the outside of the boss is made possible owing to the separable upper, and lower insulators.

A third embodiment stator core will be described with reference to FIGS. 20~26.

Figure 20:
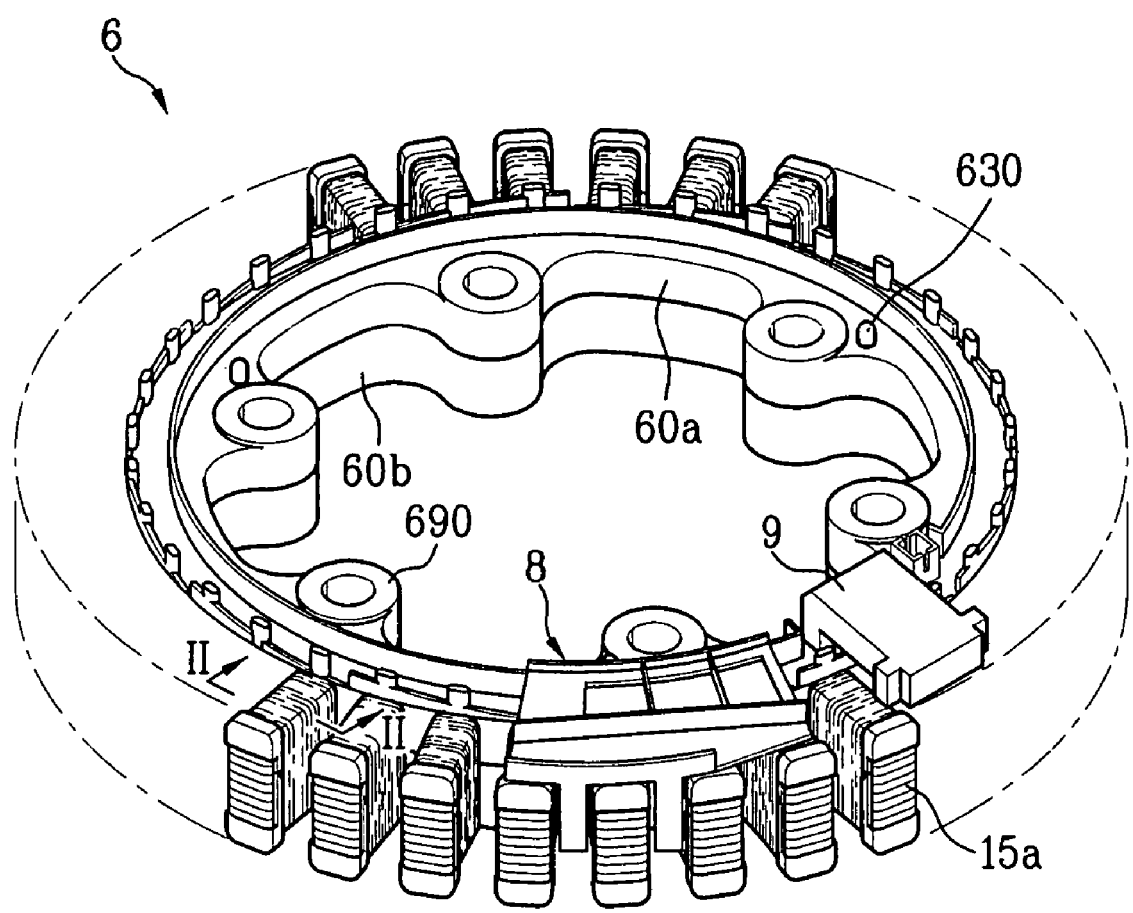
FIG. 20 illustrates a perspective view of an exterior of a stator in accordance with a third preferred embodiment of the present invention.
Figure 21:
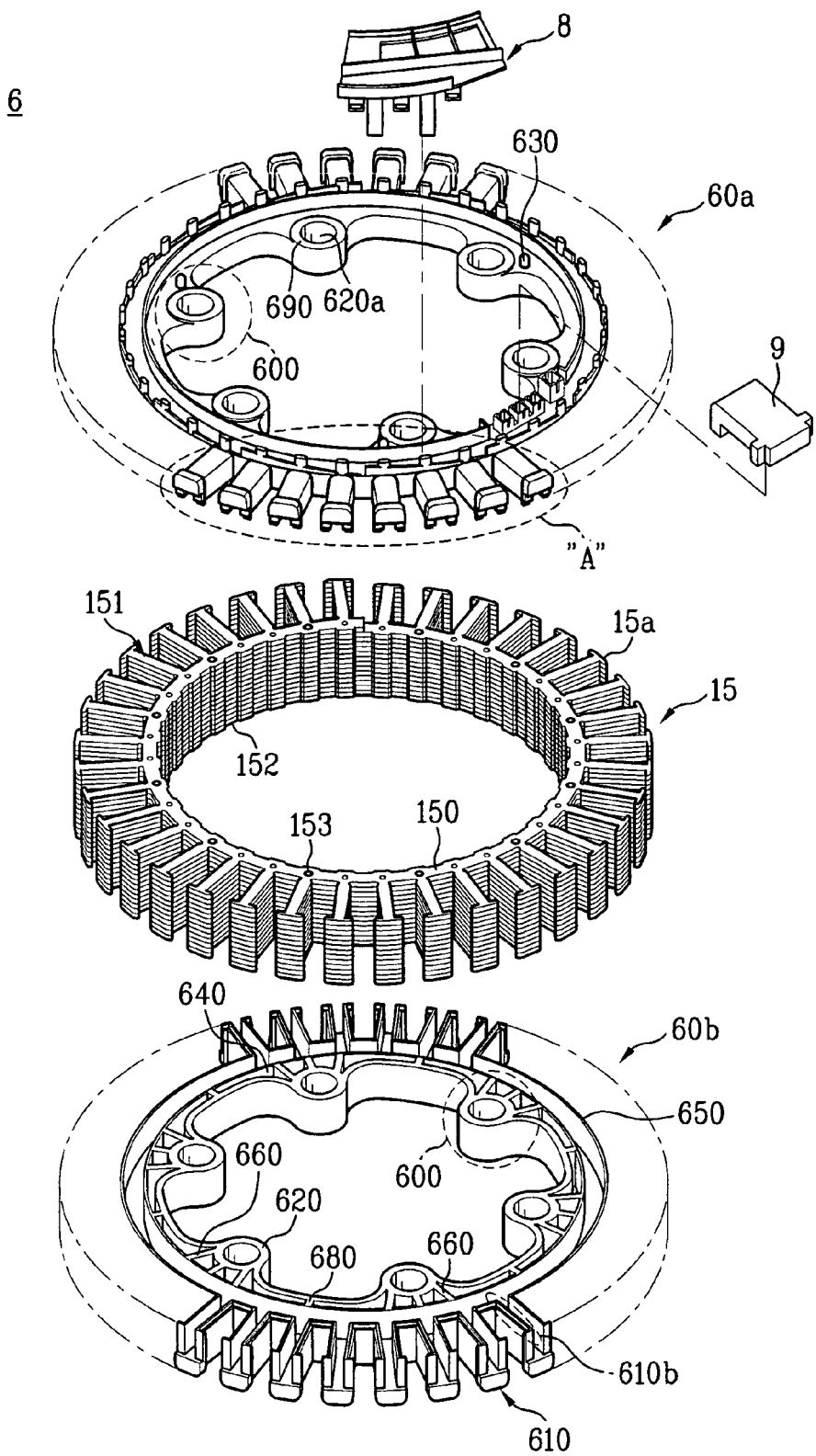
FIG. 21 illustrates a disassembled perspective view of FIG. 20.
Figure 22:
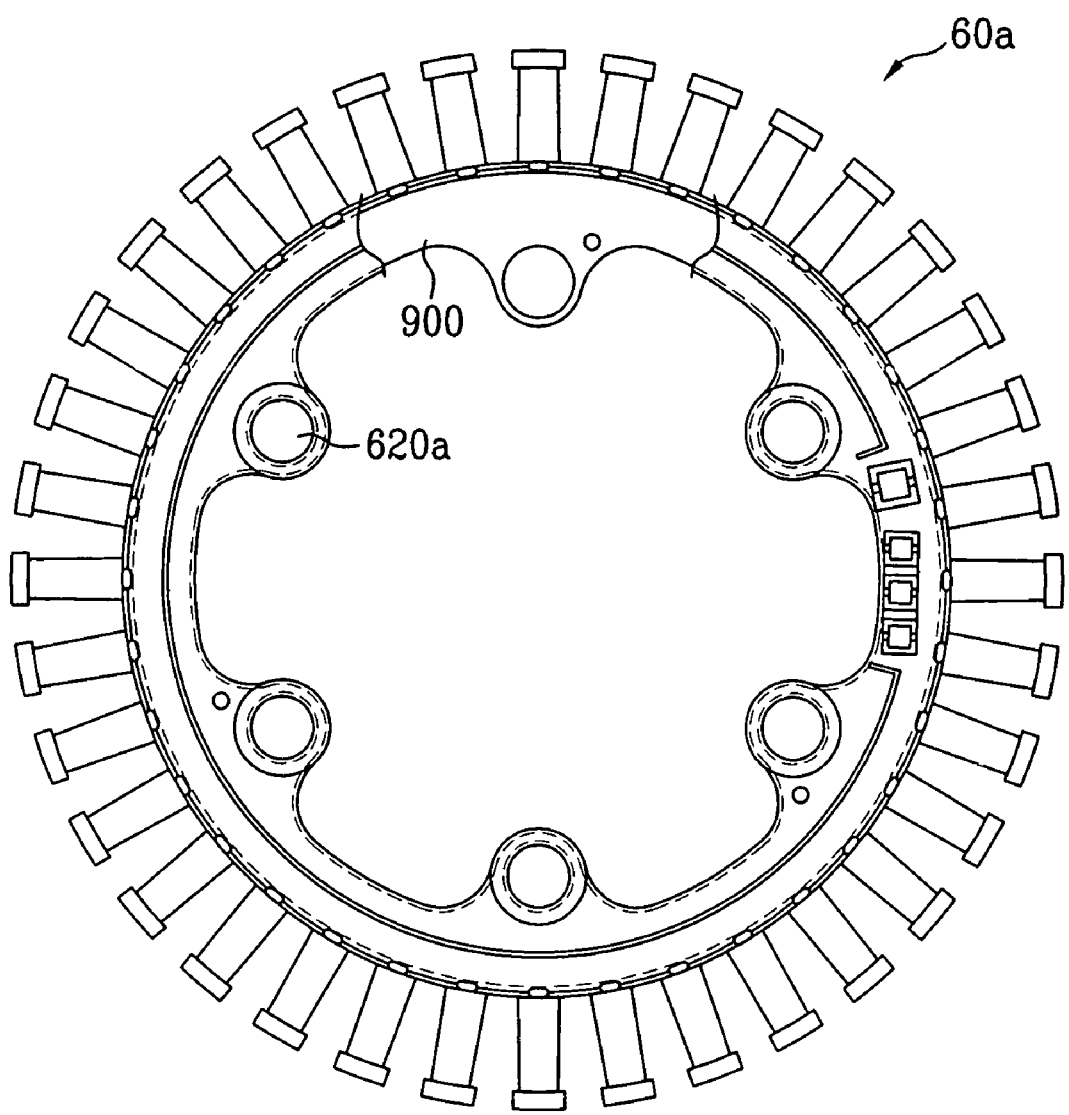
FIG. 22 illustrates a plan view of an upper insulator.
Figure 23:
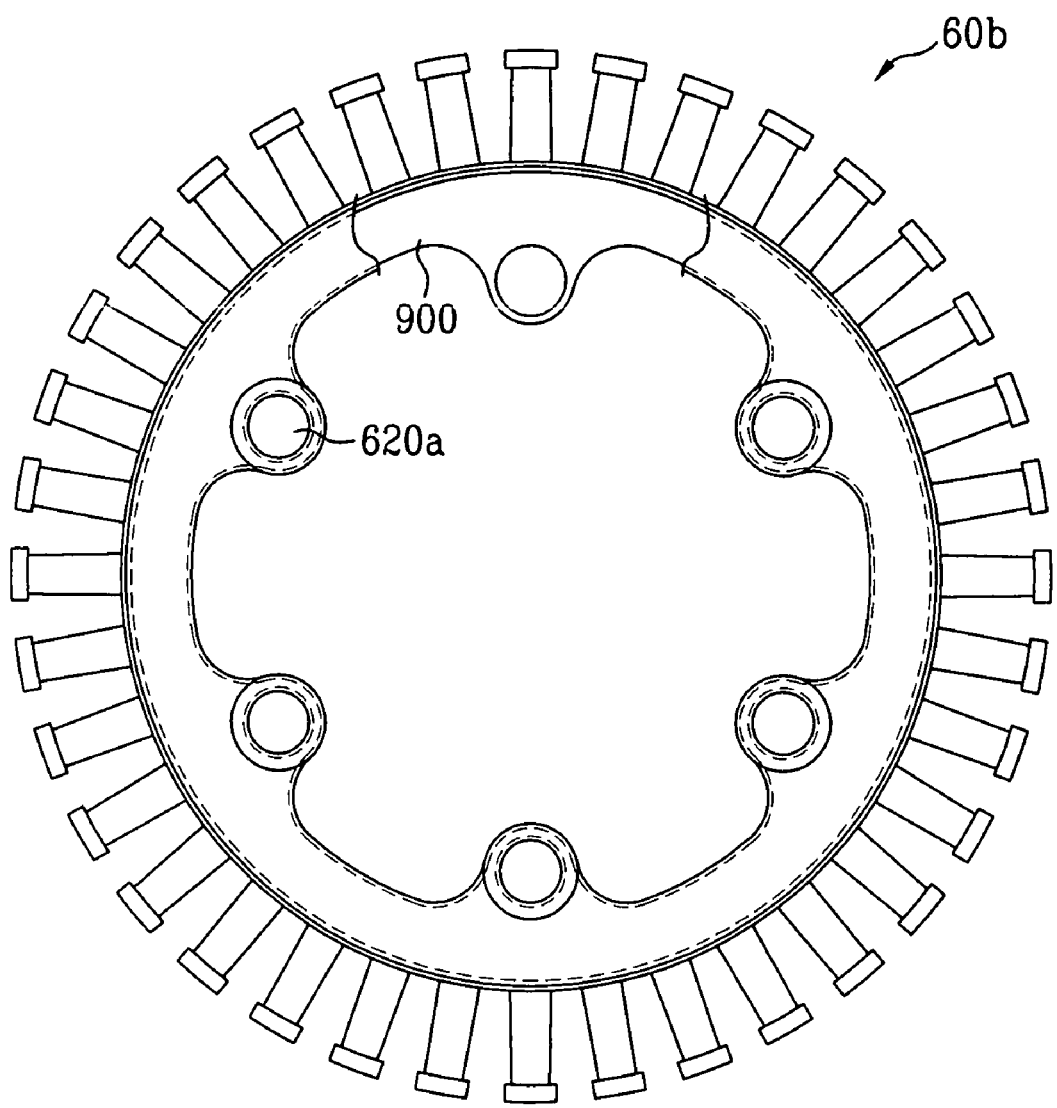
FIG. 23 illustrates a plan view of a lower insulator.

FIG. 20 illustrates a perspective view of an exterior of a stator in accordance with a third preferred embodiment of the present invention, FIG. 21 illustrates a disassembled perspective view of FIG. 20, FIG. 22 illustrates a plan view of an upper insulator, and FIG. 23 illustrates a plan view of a lower insulator.

Figure 24:
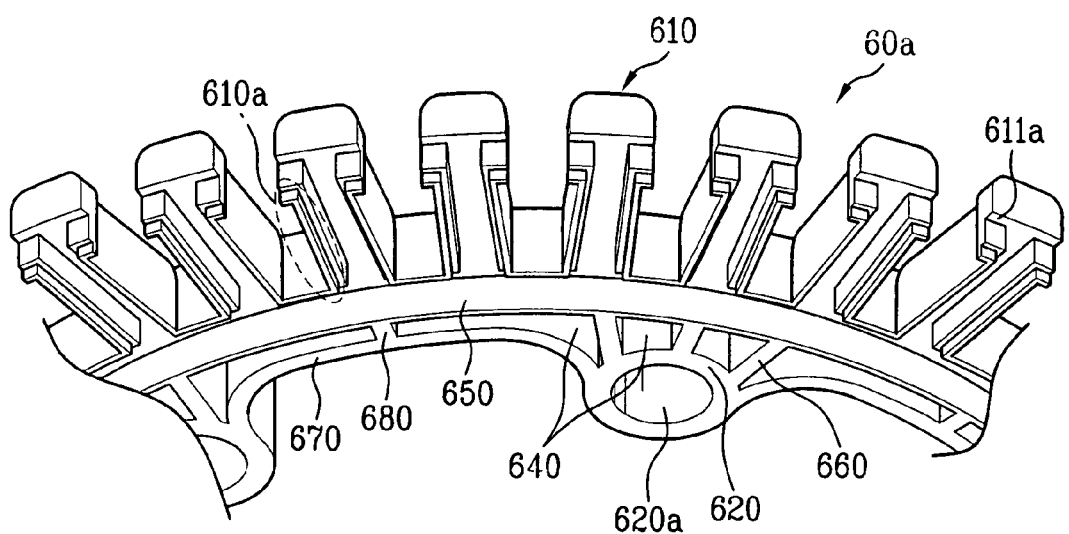
FIG. 24 illustrates a perspective view of a bottom of a portion of the upper insulator in FIG. 21.
Figure 25:
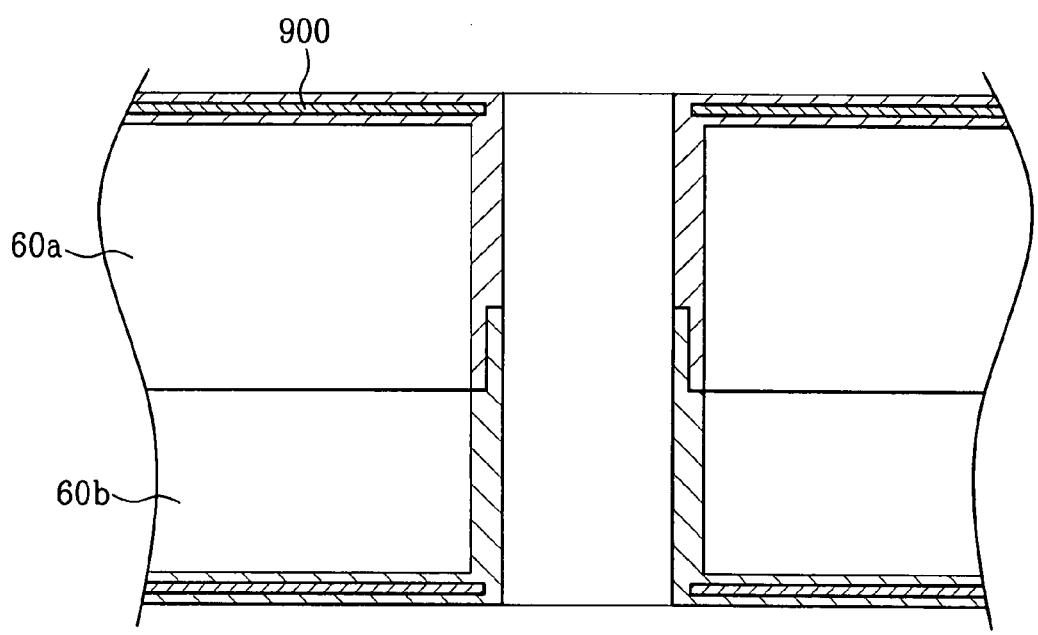
FIG. 25 illustrates a section of a fastening portion across a line II-II in FIG. 21.
Figure 26:
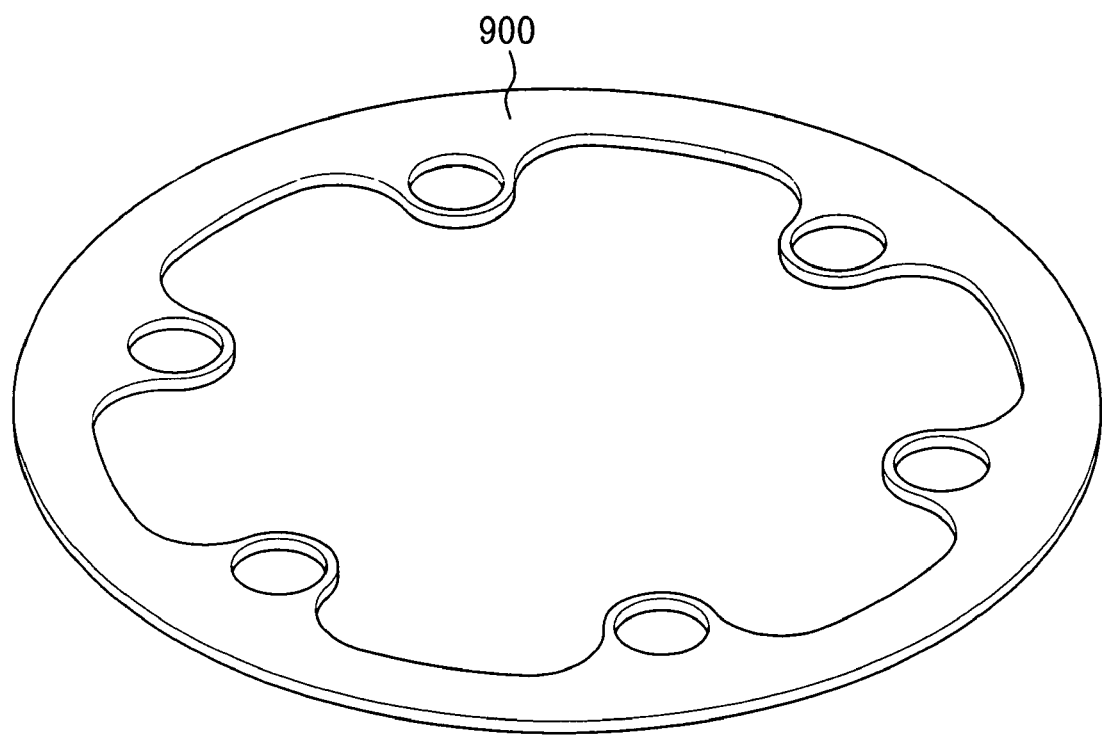
FIG. 26 illustrates a perspective view of a supporter of a metal ring shape applicable to the stator in FIG. 20.

FIG. 24 illustrates a perspective view of a bottom of a portion of the upper insulator in FIG. 21, FIG. 25 illustrates a section of a fastening portion across a line II-II in FIG. 21, and FIG. 26 illustrates a perspective view of a supporter of a metal ring shape applicable to the stator in FIG. 20.

Referring to FIGS. 20~26, the stator 6 of an outer rotor type motor in accordance with a third preferred embodiment of the present invention includes an annular stator core 15 having multiple layers formed by winding a steel plate with a stripe shape of base portion 150 and Ts 151 projected from the base portion 150 in a helix starting from a bottom layer to a top layer such that a layer overlaps with a next layer, an upper insulator 60*a* of an electric insulating material covered on an upper side of the stator core 15 in a shape complementary to a shape of the stator core 15, a lower insulator 60*b* of an electric insulating material covered on the lower side of the stator core 15 at the time of assembly with the upper insulator 60*a* in a shape complementary to a shape of the stator core 15, and annular supporters 900 of metal inserted to the upper insulator and the lower insulator, respectively.

Each of the upper insulator, the lower insulator, and the supporters 900 inserted in the upper insulator and the lower insulator respectively has three or more than three fastening portions 600 projected from an inside of the stator core 15 toward the center of the stator 6 for securing the stator 6 to a fixing side of the tub.

The fastening portion 600 has a fastening hole 620*a* for securing the stator 6 to a fixing side, such as the tub, with fastening members. The fastening hole 620*a* is constructed of a boss 620 projected on a back side of the fastening portion 600.

Each of the upper insulator 60*a* and the lower insulator 60*b* has a supporting rib 650 on an inside along a circumferential direction thereof in contact with the stator core 15 for supporting an inside surface of the core.

The fastening portion 600 of each of the upper insulator 60*a* and the lower insulator 60*b* has at least one reinforcing rib 660 connected between the boss 620 of the fastening hole 620*a* and the supporting rib 650 for spreading fastening force concentrated on the boss 620 and reinforcing a strength of the fastening portion 600.

In the meantime, it is preferable that the fastening portion 600 of each of the upper insulator 60*a* and the lower insulator 60*b* has a reinforcing rib 670 at an inside circumference thereof in the back side, and at least one connection rib 680 connected between the reinforcing rib 670 and the supporting rib 650 which supports an inside surface of the core in a radial direction, for providing a supporting force.

In the meantime, each of the upper insulator 60*a* and the lower insulator 60*b* has tips 610*a* and 610*b* on opposite sidewalls of each of the Ts 610 thereof having shapes in complementary to each other for fitting in at the time of assembly.

Each of the tips 610*a* and 610*b* on each of the Ts 610 has a "⌞" shape if the other side has a "⌐" shape.

At the opposite end surfaces substantially perpendicular to the opposite sidewall surfaces of the teeth 610 of the upper insulator 60*a* and the lower insulator 60*b*, there are also the tips 610*a* and 610*b* having shape in complementary to each other.

The teeth 610 of each of the upper insulator 60*a* and the lower insulator 60*b* has a seating surface 611*a* at an end for seating a core shoe 151*a* of the stator core 15.

Along with this, in the vicinity of the fastening hole 620*a* of the fastening portion 600 of the upper insulator 60*a*, there is a positioning projection 630 having a shape in complementary to a positioning hole or a slot (not shown) in the fixing side of the tub.

The metal supporters 900 inserted in the upper insulator 60*a* and the lower insulator 60*b* serve as portions to support the fastening force when the fastening force is applied for securing the stator 6 to a tub wall.

In the meantime, the fastening hole 620*a* of each of the upper insulator 60*a* and the lower insulator 60*b* has a land around the fastening hole 620*a* for landing of the bolt head at the time of bolt fastening.

There may be a metal tube or a spring pin on an inside of the fastening hole 620, for reinforcing strength of the fastening portion.

The base portion 150 of the stator core 15 has slots 152 for reducing stress at the time of winding in formation of the core to make the winding easy, and the multiple layers thereof are fastened with rivets 153 passed through pass through holes in the base portion 150.

In FIG. 21, unexplained reference numeral 8 denotes a hole sensor assembly for controlling the motor, and 9 denotes a tap housing assembly for tapping power to supply the power to a stator side.

The work of the third embodiment stator will be described.

Different form the divisional core DC, the application of so called helical core HC, formed by stacking a steel plate having Ts 151 and a base portion 150 while winding in a helix, to the embodiment as the stator core 15 permits the embodiment to omit steps of aligning, and welding the core segments, to simplify a fabrication process.

Moreover, different from the divisional core, since the stator core 15 has no projected portion, the stator core 15 can reduce waste of material.

That is, a method for fabricating a stator of the embodiment not only simplifies a fabrication process, but also reduces waste of material.

Moreover, even if the stator 6 of the embodiment improves structures of the upper, and the lower insulator 60*a*, and 60*b* such that no projected portions are formed at the core itself for supporting the fastening force at the time of fastening the stator 6 to the tub side, the stator 6 still has a rigidity enough to support the bolt fastening force.

That is, by providing structures that work the same with the projected portion of the divisional core to the fasting portions 600 of the upper, and lower insulators 60*a*, and 60*b*, and the fastening portions 600 of the supporter 900 inserted in the upper, and lower insulators 60*a* and 60*b*, a stator 6 can be provided, to which the helical core HC is applicable.

Especially, different from the second embodiment, because the supporters 900 are inserted in the upper, and lower insulators 60*a*, and 60*b* additionally, which are formed of metal, such as steel plate, the stator core of the third embodiment have adequate rigidity against the bolt fastening force.

Moreover, spaces 640 between the ribs 650, 660, 670, and 680 at a back side of the fastening portion 600 dampen and attenuate vibration occurred during driving the motor, to improve mechanical reliability of the stator 6, and contributes to save material of the insulators.

The supporting ribs 650 of the upper insulator 60*a* and the lower insulator 60*b* formed at an inside in contact with the stator core 15 along the circumferential direction support an inside surface of the stator core 15.

The reinforcing rib 660 connected between the boss 620 of the fastening hole 620*a* and the supporting rib 650 at each of the fastening portion 600 of the upper insulator 60*a* and the lower insulator 60*b* spreads the fastening force concentrated on the boss 620, and reinforces a strength of the fastening portion 600.

According to this, the stator 6 can effectively prevent a fastening portion of the stator 6 suffering from breakage caused by vibration at the spinning, and shaking and deformation of the rotor 5 even at a large capacity drum type washing machine having a weight over 1.5 kg only of the stator, and a spinning speed ranging 600~2,000 RPM.

As a positioning projection 630, or 143*b* in the vicinity of the fastening hole 620*a* of the fastening portion 600 fits in a positioning hole (not shown) in the tub 2, fastening of the stator 6 is easy.

Thus, the positioning projection enables an easy assembly of the stator 6 with the tub 2, and a serviceman to make an easy repair at the time of after service.

Of course, the positioning projection 630 may be formed on the tub 2, and the positioning hole may be formed in the fastening portion 600.

In the meantime, alike the second embodiment (see FIGS. 17 and 18), the insulators of the third embodiment are also versatile.

That is, since the separate type upper, and lower insulators of the embodiment are applicable to the core regardless of the total height of the core within a certain range of the total height, the separate type upper, and lower insulators of the embodiment can improve workability on an assembly line.

In the meantime, in a case a metal bushing 800 is press fit to an inside of the fastening hole like the second embodiment (see FIG. 14), a supporting force against the bolt fastening force at the time of fastening the stator can be enhanced further.

Figure 27:
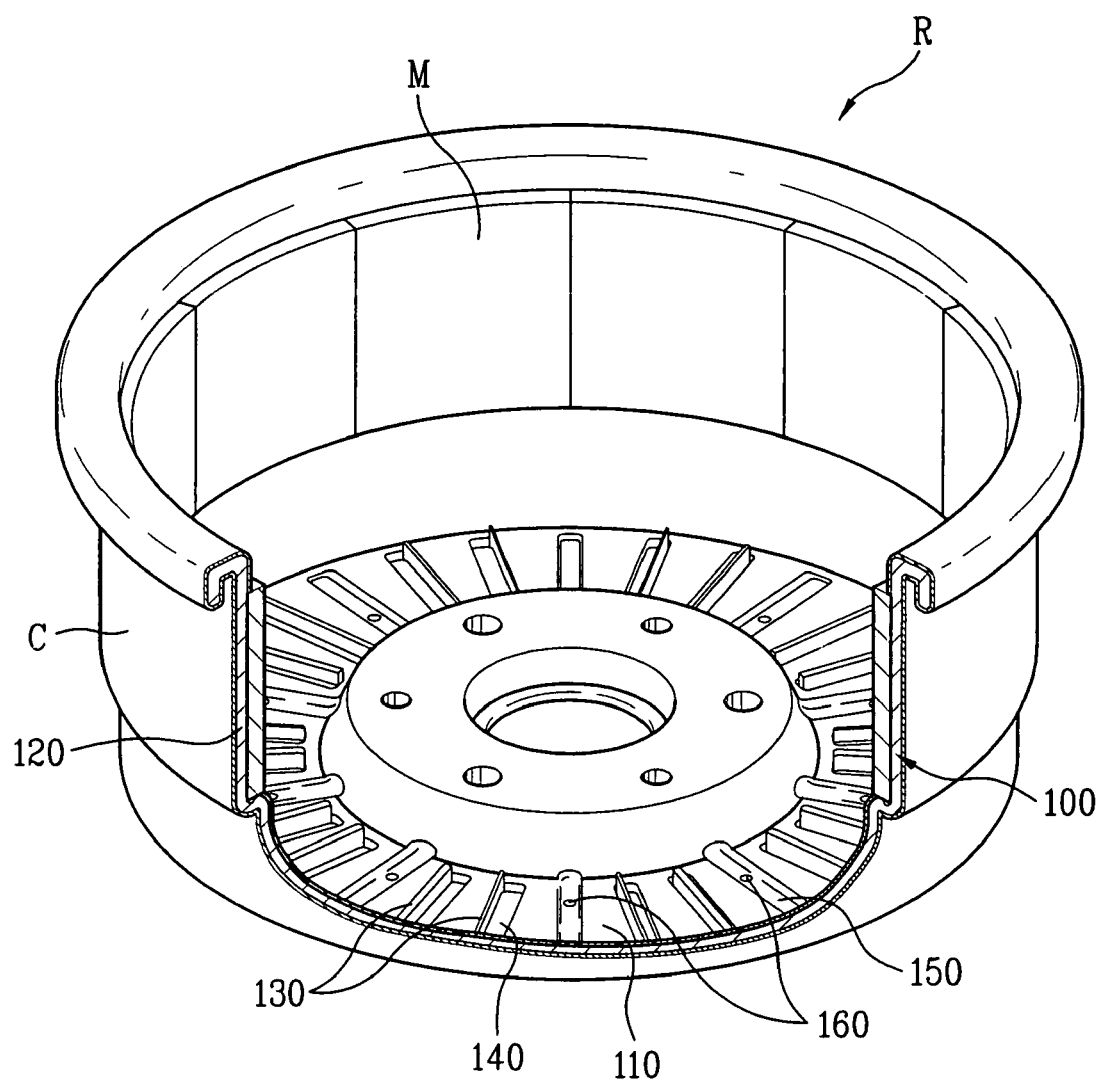
FIG. 27 illustrates a perspective view of an outer rotor in accordance with a fourth preferred embodiment of the present invention, with a partial cut away view.

A fourth embodiment of the present invention will be described with reference to FIGS. 27, and 28. FIG. 27 illustrates a perspective view of an outer rotor in accordance with a fourth preferred embodiment of the present invention, with a partial cut away view, and FIG. 28 illustrates a section of FIG. 27.

Figure 28:
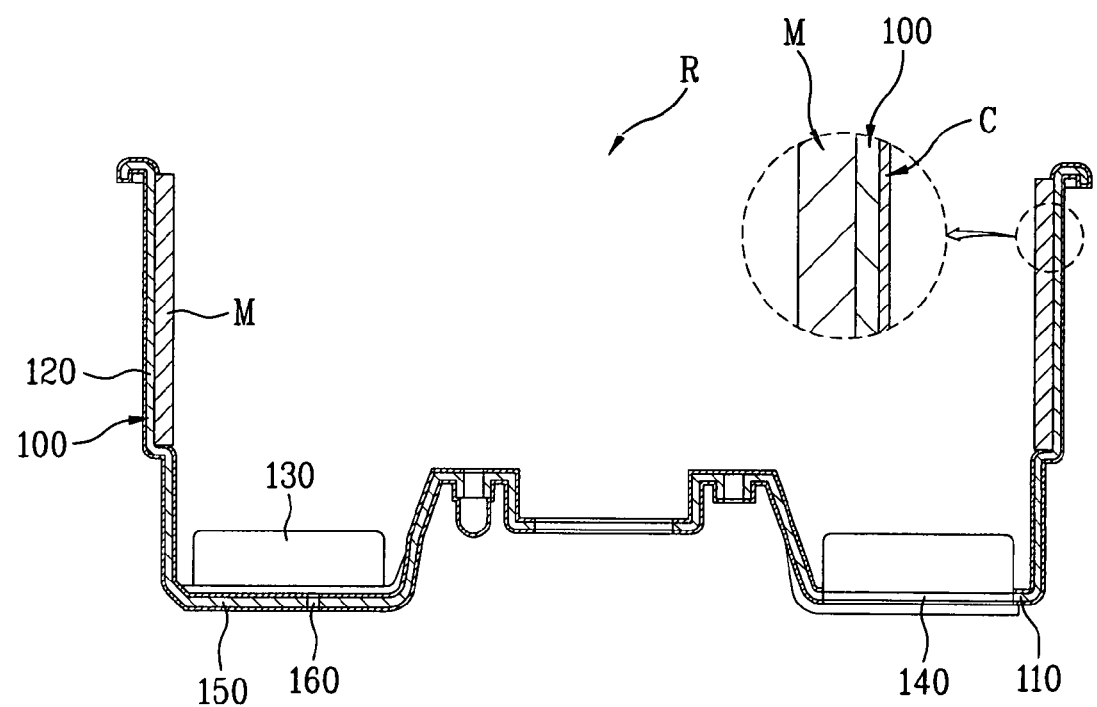
FIG. 28 illustrates a section of FIG. 27.

Referring to FIGS. 27 and 28, the outer rotor R in accordance with the fourth embodiment of the present invention includes a rotor frame 100 of a steel plate, to serve as a back yoke too. The rotor frame 100 has synthetic resin coated on an outside surface thereof.

The rotor frame 100 of a steel plate includes a bottom 110, and a sidewall 120 substantially perpendicular to the bottom, wherein the sidewall 120 of the rotor frame 100 also serves as a back yoke, and inside, and outside surfaces of the rotor frame 100 inclusive of an outside surface of the sidewall 120 have a coat C of synthetic resin.

The synthetic resin is coated by injection molding or the like, to a thickness below 3 mm.

The work of the outer rotor of the embodiment is as follows.

Owing to the synthetic resin coated layer C on the surface of the rotor frame 100, even if the outer rotor R is scratched on the surface of the rotor during transportation or other situation, the synthetic resin coated layer C is scratched, but the surface of the rotor frame 100 inside of the coated layer C is not scratched, to protect the surface of the rotor frame 100.

Moreover, because the synthetic resin coated layer C on the surface of the outer rotor R serves as a protection film, to prevent water or detergent from infiltrating into the surface of the rotor frame 100, rusting or corrosion of the surface of the rotor frame 100 can be prevented.

Despite of the anti-rusting heat treatment on a surface of the related art steel plate rotor R, though the related art steel plate rotor R has problems in that rust occurs on a portion of the surface scratched during transportation or other situations as water infiltrates during use of the product, or the rust occurs on the surface due to chemical reaction of the detergent during long time use of the product, the outer rotor R of the present invention can prevent such problems owing to the protection of the synthetic resin coated layer C on the surface of the rotor frame 100.

Particularly, the drawings of the embodiment illustrate that the synthetic resin is coated on an entire surface of the rotor, it is preferable that at least the outside circumferential surface of the sidewall 120 of the rotor frame 100 which has a high probability of coming into contact with water or detergent, and is liable to be scratched is coated with synthetic resin without fail, even if an entire surface, such as an inside surface and the outside surface, is not coated with synthetic resin, taking weight increase of the rotor, and a cooling time period increase of the synthetic resin in the injection molding caused by the synthetic resin coating into account.

Particularly, because the rotor becomes heavier, and a cooling time period of the synthetic resin becomes longer if a thickness of the coated synthetic resin is thicker than 3 mm, which is not favorable for mass production, it is preferable that the thickness of the synthetic resin is below 3 mm.

In the meantime, the outer rotor R of the embodiment also has a step portion along a circumferential direction having a supporting surface for seating the magnets M on the sidewall 120 of the rotor frame 100.

Moreover, there are a plurality of radial cooling fins 130 around a center portion of the bottom 110 of the rotor frame 100 of the outer rotor R to blow air toward the stator to cool down heat generated at the stator.

The pass through holes 140 formed in parallel to the cooling fins 130 serve as vent holes, the embossed portions 150 between adjacent cooling fins 130 on the bottom 110 of the rotor frame 100 reinforces the rotor frame 100, and water is drained through the drain holes 160 in the embossed portions 150.

A fifth embodiment of the present invention will be described in detail, with reference to FIGS. 29 and 30.

Figure 29:
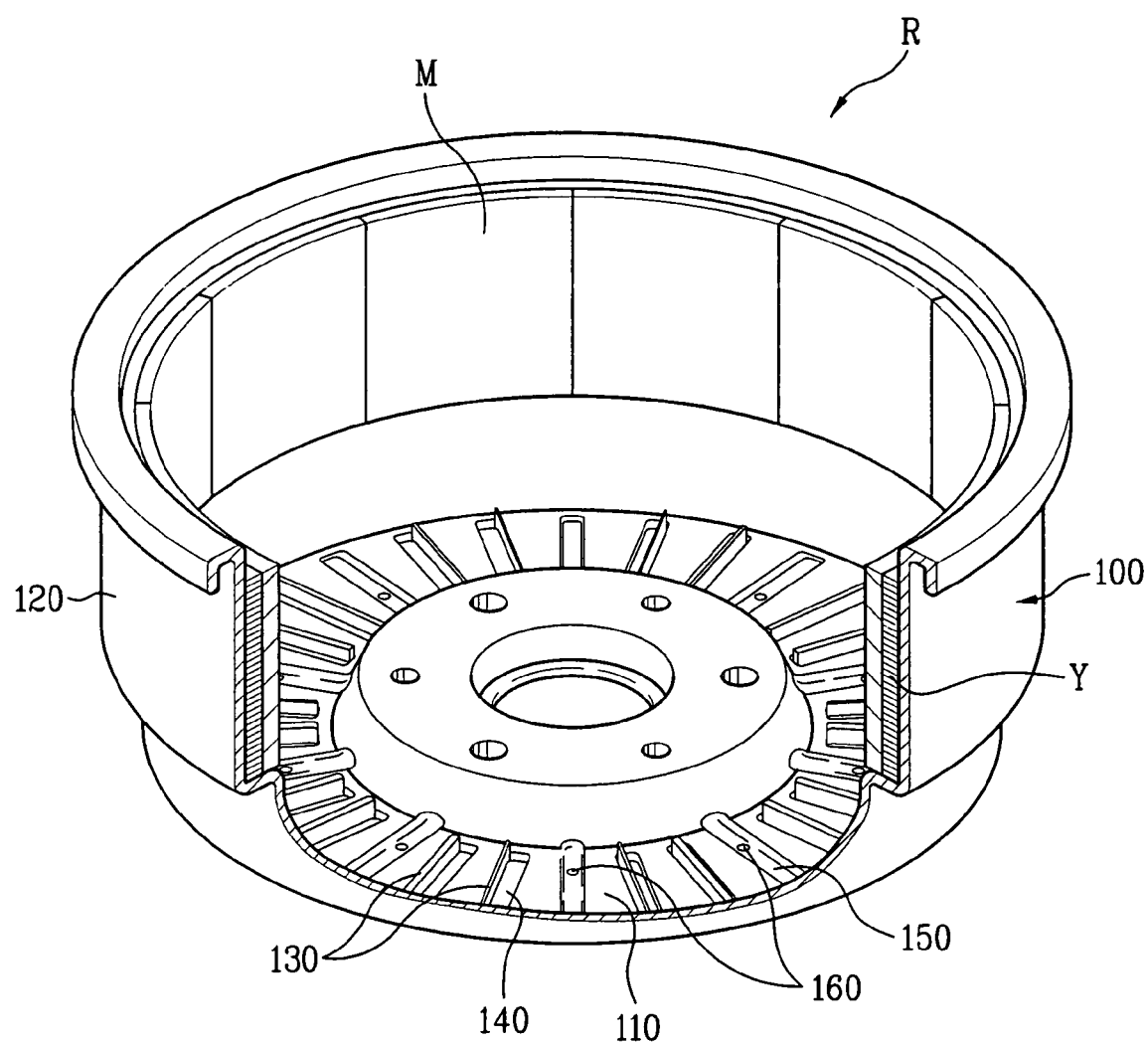
FIG. 29 illustrates a perspective view of an outer rotor in accordance with a fifth preferred embodiment of the present invention, with a partial cut away view.
Figure 30:
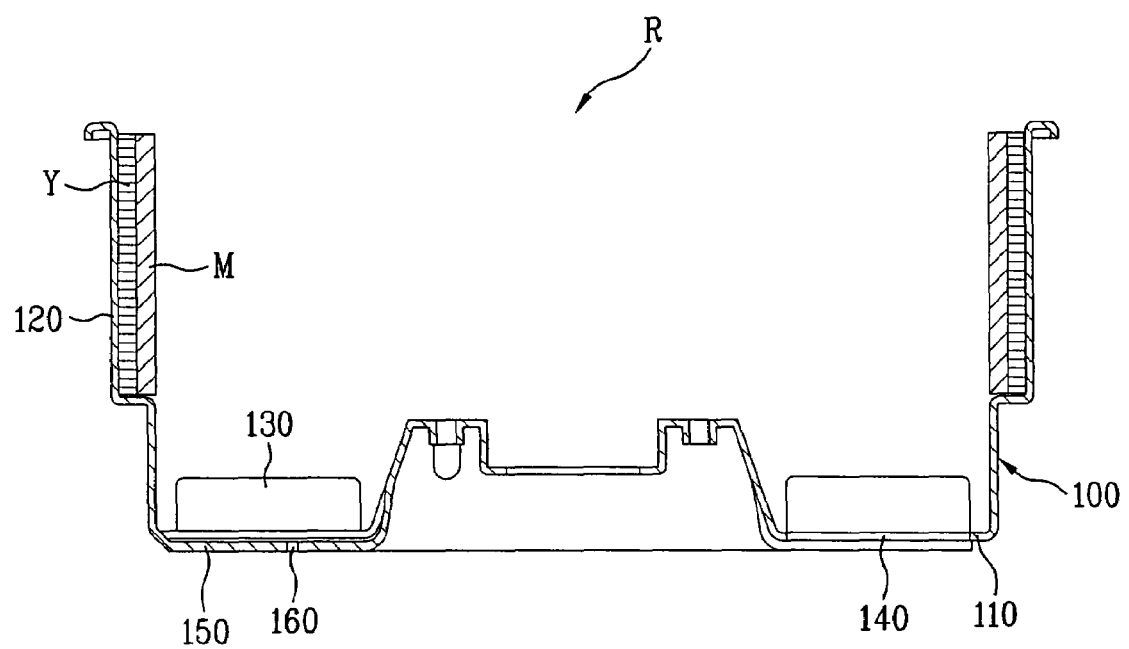
FIG. 30 illustrates a section of FIG. 29.

FIG. 29 illustrates a perspective view of an outer rotor in accordance with a fifth preferred embodiment of the present invention, with a partial cut away view, and FIG. 30 illustrates a section of FIG. 29.

Referring to FIGS. 29 and 30, the outer rotor R includes a rotor frame having a bottom 110, and a sidewall 120 extended in a substantially vertical direction from a circumference of the bottom 110, wherein an annular back yoke Y is mounted on an inside surface of the sidewall 120 of the rotor frame 100, and magnets M are in turn attached to an inside surface of the back yoke Y.

In this instance, it is preferable that a step portion is provided on the sidewall 120 of the rotor frame of the outer rotor R for forming a supporting surface the magnets M are to be seated thereon.

The annular yoke may be formed as one body without discontinued portion, or one body with discontinued portions.

The annular yoke formed as one body with discontinued portions may abut at the discontinued portions, or the discontinued portions may be welded, to connect the discontinued portions.

In the meantime, the annular back yoke Y may be a stack of thin plates, or one body without the stacking.

The back yoke Y may be secured to an inside surface of the sidewall 120 of the rotor frame of the outer rotor R, or the like.

Moreover, alike the fourth embodiment, it is preferable that the outer rotor of the embodiment also has a plurality of cooling fins 130 around a center of the bottom 110 of the rotor frame 100, lanced toward an open side of the rotor frame 100.

The pass through holes 140 formed parallel to the cooling fins 130 by lancing serve as vent holes.

There are embossed portions 150 between adjacent cooling fins 130 on the bottom 110 of the rotor frame 100 for reinforcing strength of the rotor, and there are drain holes 160 in the embossed portions 150 for draining water.

The work of the embodiment (i.e., the fifth embodiment) is as follows.

As the outer rotor R of the embodiment has the annular back yoke Y mounted on the inside surface of the sidewall 120 of the rotor frame 100, and the magnets M attached to the inside surface of the back yoke Y again, rigidity of the outer rotor R is enhanced owing to the back yoke Y.

That is, in a structure in which the back yoke Y is mounted at a position far from the center of the outer rotor R, and the magnets M are mounted at a position near to the center of the outer rotor R, which increases rigidity of the sidewall of the outer rotor R significantly owing to the back yoke Y which is in close contact with the rotor frame sidewall 120 of the outer rotor R, the throbbing of the rotor during spinning can be prevented, effectively.

Moreover, as the supporting surface at the sidewall 120 of the rotor frame 100 supports the back yoke Y and the magnets M at the same time, mounting of the back yoke is easy.

In the meantime, there are a plurality of radial cooling fins 130 around a center portion of the bottom 110 of the rotor frame 100 to blow air toward the stator to cool down heat generated at the stator.

Moreover, the pass through holes 140 formed in parallel to the cooling fins 130 serve as vent holes, and embossed portions 150 between adjacent cooling fins 130 on the bottom 110 of the rotor frame 100 reinforce strength of the rotor, and drain holes 160 in the embossed portions 150 drain water.

Though the present invention has been described taking the drum type washing machine as an example, the present invention is applicable to a pulsator type washing machine, too.

The present invention has the following advantages.

The present invention can reduce material and weight required for fabrication of the stator of the BLDC motor for a drum type washing machine, simplifies the fabrication process, and enables secure mounting of the stator on a fixing side, such as the tub.

Especially, because the present invention enables to reduce materials of the stator core and the insulator, and secure mounting of the stator on a fixing side, such as the tub or the bearing housing like the divisional core, the present invention is more suitable to a BLDC motor for a drum type washing machine that has a weight of 1.5 kg only of the stator, and a rotation speed varied 0~2,000 RPM or over.

The drum type washing machine of the present invention permits easy assembly of the stator and the tub on an assembly line, as well as easy repair during services.

Moreover, the employment of the helical core HC of which winding is easy permits to prevent waste of base metal, permits easy fabrication, and improves mechanical reliability and extends a lifetime owing to the enhanced rigidity of the fastening portion of the stator that reduces noise and vibration.

The coating of synthetic resin on a surface of the outer rotor of steel plate can prevent scratching of the surface of the outer rotor which is liable to occur during transportation.

Along with this, the effective cut off of chemical reaction with detergent even in a long time use extends a lifetime of the motor and improves reliability.

The back yoke Y in close contact with an inside surface of the sidewall 120 of the rotor frame 100 permits to increase rigidity of the sidewall of the outer rotor R significantly, to prevent the rotor from throbbing occurred at the time of spinning.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An outer rotor type motor for a drum type washing machine comprising:

an annular stator core having multiple layers formed by winding a base portion in a shape of stripe with Ts projected from the base portion in a helix starting from a bottom layer to a top layer;

an insulator insert molded to cover an outside surface of the stator core for insulating the stator core electrically;

fastening portions formed as one body with the insulator each projected from an inside circumferential surface of the stator core toward a center of the stator, for fixedly securing the stator to the tub, wherein the base portion of the stator core has an arc shaped slots each for reducing stress in winding the core as well as serving as a portion of a fastening hole, and each of the fastening portion of the insulator formed to cover the slots has a fastening hole formed therein; and an outer rotor of steel plate having a bottom, a sidewall extended from the bottom in perpendicular thereto substantially, and magnets on an inside of the sidewall, wherein the rotor frame and a back yoke are formed as one unit so that the rotor frame also serves as the back yoke, and the rotor frame has one coat of synthetic resin applied to at least an outside surface of the rotor frame.

2. The outer rotor type motor as claimed in claim 1, wherein the synthetic resin is coated by injection molding.

3. The outer rotor type motor as claimed in claim 1, wherein the coating of the synthetic resin has a thickness below 3mm.

4. An outer rotor type motor for a drum type washing machine comprising:

an annular stator core having multiple layers formed by winding a base portion in a shape of stripe with Ts projected from the base portion in a helix starting from a bottom layer to a top layer;

an insulator insert molded to cover an outside surface of the stator core for insulating the stator core electrically;

fastening portions formed as one body with the insulator each projected from an inside circumferential surface of the stator core toward a center of the stator, for fixedly securing the stator to the tub, wherein the base portion of the stator core has an arc shaped slots each for reducing stress in winding the core as well as serving as a portion of a fastening hole, and each of the fastening portion of the insulator formed to cover the slots has a fastening hole formed therein; and an outer rotor of steel plate having a bottom, a sidewall extended from the bottom in perpendicular thereto substantially, and magnets on an inside of the sidewall, wherein an annular back yoke is mounted on an inside surface of the sidewall of the outer rotor, and the magnets are attached to an inside surface of the back yoke.

5. The outer rotor type motor as claimed in claim 3, wherein the sidewall of the rotor frame of the outer rotor includes a stepped portion having a supporting surface for seating the back yoke and the magnets at the same time.

6. The outer rotor type motor as claimed in claim 3, wherein the annular back yoke is one body without discontinued portions in a circumferential direction.

7. The outer rotor type motor as claimed in claim 3, wherein the annular back yoke has the discontinued portions in a circumferential direction.

8. The outer rotor type motor as claimed in claim 3, wherein opposite end surfaces of the discontinued portion of the annular back yoke are connected by welding.

9. The outer rotor type motor as claimed in claim 3, wherein the annular back yoke includes a stack of thin back yoke pieces.

10. The outer rotor type motor as claimed in claim 3, wherein the annular back yoke is one whole body.

\* \* \* \* \*